(12) United States Patent
Lim et al.

(10) Patent No.: US 10,630,997 B2
(45) Date of Patent: *Apr. 21, 2020

(54) IMAGE DECODING METHOD, IMAGE CODING METHOD, IMAGE DECODING APPARATUS, IMAGE CODING APPARATUS, PROGRAM, AND INTEGRATED CIRCUIT

(71) Applicant: Sun Patent Trust, New York, NY (US)

(72) Inventors: Chong Soon Lim, Singapore (SG); Min Li, Singapore (SG); Hai Wei Sun, Singapore (SG); Youji Shibahara, Tokyo (JP); Takahiro Nishi, Nara (JP)

(73) Assignee: Sun Patent Trust, New York, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/255,549

(22) Filed: Sep. 2, 2016

(65) Prior Publication Data

US 2016/0373776 A1   Dec. 22, 2016

Related U.S. Application Data

(63) Continuation of application No. 13/502,592, filed as application No. PCT/JP2010/006385 on Oct. 29, 2010, now Pat. No. 9,467,710.

(30) Foreign Application Priority Data

Oct. 30, 2009   (JP) ................................ 2009-251518

(51) Int. Cl.
*H04N 19/44*   (2014.01)
*H04N 19/61*   (2014.01)
(Continued)

(52) U.S. Cl.
CPC ........... *H04N 19/44* (2014.11); *H04N 19/126* (2014.11); *H04N 19/176* (2014.11); *H04N 19/463* (2014.11); *H04N 19/61* (2014.11)

(58) Field of Classification Search
CPC ........................... H04N 19/527; G06T 3/4084
(Continued)

(56) References Cited

U.S. PATENT DOCUMENTS

| 4,015,238 A | 3/1977 | Davis |
| 5,629,778 A * | 5/1997 | Reuman ............... H04N 19/527 |
| | | 375/E7.19 |

(Continued)

FOREIGN PATENT DOCUMENTS

| CA | 2 680 140 | 11/2008 |
| CN | 101401435 A | 4/2009 |

(Continued)

OTHER PUBLICATIONS

International Search Report dated Jan. 25, 2011 in corresponding International Application No. PCT/JP2010/006385.
(Continued)

*Primary Examiner* — Chikaodili E Anyikire
*Assistant Examiner* — Daniel Chang
(74) *Attorney, Agent, or Firm* — Wenderoth, Lind & Ponack, L.L.P.

(57) ABSTRACT

An image decoding method including: obtaining an old quantization scaling matrix which is a decoded quantization scaling matrix and is used for decoding a new quantization scaling matrix; obtaining, from the coded stream, an update parameter indicating an amount of change in the new quantization scaling matrix with respect to the old quantization scaling matrix; decoding the new quantization scaling matrix using the old quantization scaling matrix obtained in the obtaining of an old quantization scaling matrix and the update parameter obtained in the obtaining of an update parameter; and decoding the coded image using the new quantization scaling matrix decoded in the decoding of the new quantization scaling matrix.

22 Claims, 23 Drawing Sheets

(51) Int. Cl.
*H04N 19/463* (2014.01)
*H04N 19/126* (2014.01)
*H04N 19/176* (2014.01)

(58) Field of Classification Search
USPC .................................... 375/E7.19, 240.18
See application file for complete search history.

(56) References Cited

U.S. PATENT DOCUMENTS

| | | |
|---|---|---|
| 6,445,739 B1 | 9/2002 | Shen et al. |
| 6,501,793 B2 | 12/2002 | Shen et al. |
| 7,010,035 B2 | 3/2006 | Shen et al. |
| 7,630,435 B2 | 12/2009 | Chen et al. |
| 7,860,159 B2 | 12/2010 | Shen et al. |
| 7,912,122 B2 | 3/2011 | Kadono et al. |
| 7,933,327 B2 | 4/2011 | Lu et al. |
| 7,995,650 B2 | 8/2011 | Kadono et al. |
| 2001/0021222 A1 | 9/2001 | Shen et al. |
| 2002/0181592 A1* | 12/2002 | Gagarin ............... G06T 3/4084 375/240.18 |
| 2003/0067980 A1 | 4/2003 | Shen |
| 2004/0044527 A1 | 3/2004 | Thumpudi et al. |
| 2006/0171459 A1 | 8/2006 | Shen et al. |
| 2007/0189626 A1 | 8/2007 | Tanizawa et al. |
| 2007/0292039 A1 | 12/2007 | Kadono et al. |
| 2008/0089410 A1 | 4/2008 | Lu et al. |
| 2008/0187052 A1 | 8/2008 | Terada et al. |
| 2008/0192838 A1 | 8/2008 | Chen et al. |
| 2009/0034612 A1 | 2/2009 | Zheng et al. |
| 2010/0054330 A1 | 3/2010 | Chen et al. |
| 2010/0086028 A1 | 4/2010 | Tanizawa et al. |
| 2011/0110423 A1 | 5/2011 | Kadono et al. |
| 2011/0150082 A1 | 6/2011 | Lu et al. |
| 2011/0150083 A1 | 6/2011 | Lu et al. |

FOREIGN PATENT DOCUMENTS

| | | |
|---|---|---|
| EP | 1 995 971 A1 | 11/2008 |
| JP | 6-284412 | 10/1994 |
| JP | 2001-313946 | 11/2001 |
| JP | 2003-189308 | 7/2003 |
| JP | 2007-520948 | 7/2007 |
| JP | 2008-193410 | 8/2008 |
| WO | 98/35503 | 8/1998 |
| WO | 2005/072312 | 8/2005 |
| WO | 2005/076613 | 8/2005 |
| WO | 2005/076614 | 8/2005 |
| WO | 2008/132890 | 11/2008 |

OTHER PUBLICATIONS

"Information technology—Coding of audio-visual objects—Part 10: Advanced Video Coding", International Standard, ISO/IEC 14496-10, Second edition, Oct. 1, 2004, pp. i-xi and 1-267.

Extended European Search Report dated Jan. 29, 2014 in corresponding European Application No. 10826353.4.

Jiuhuai Lu et al., "Proposal of quantization weighting for H.264/MPEG-4 AVC", Joint Video Team (JVT) of ISO/IEC MPEG & ITU-T VCEG (ISO/IEC JTC1/SC29/WG11 and ITU -T SG16 Q.6); 11th Meeting: Munich, DE, Mar. 15-19, 2004, pp. 1-10.

Office Action dated Mar. 31, 2014 in corresponding Chinese Application No. 201080048051.1 (with partial English translation).

* cited by examiner

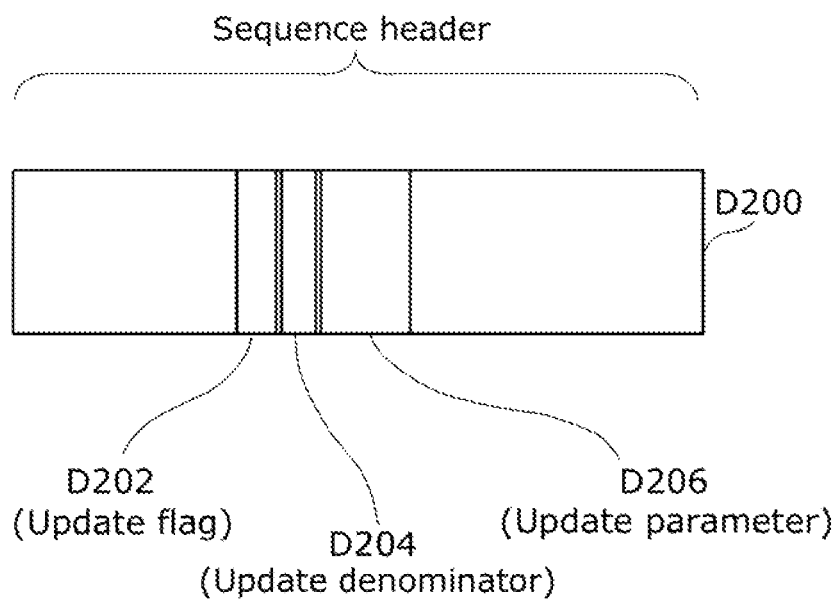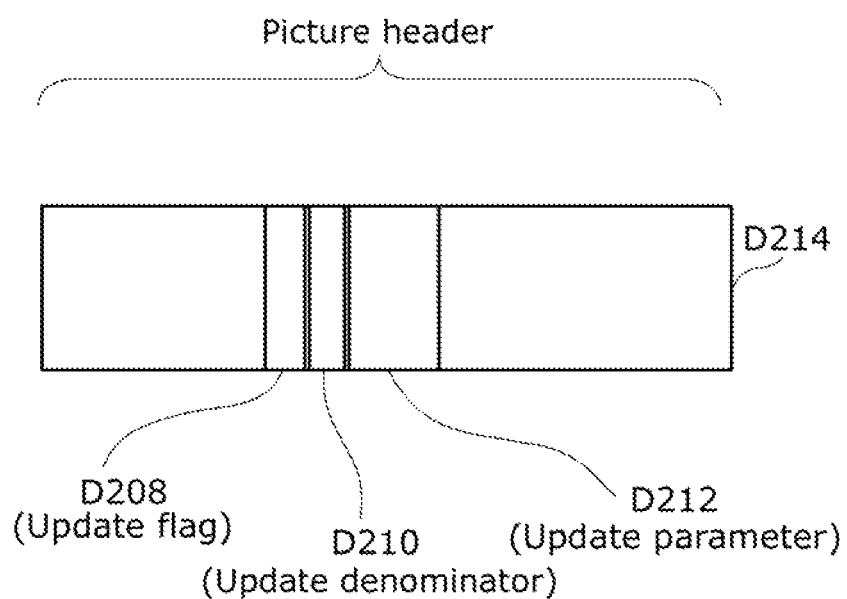

IMAGE DECODING METHOD, IMAGE CODING METHOD, IMAGE DECODING APPARATUS, IMAGE CODING APPARATUS, PROGRAM, AND INTEGRATED CIRCUIT

TECHNICAL FIELD

The present invention is applicable to every multimedia data coding and, in particular, image and video decoding and coding.

BACKGROUND ART

In every image or video coding scheme, quantization is a significant step of compressing data by removing a certain amount of information in an image or a video. The quantization is usually performed by transforming data from space domain into frequency domain so that the data can be more efficiently compressed by removing information in a quantization process.

In most image or video coding schemes, the quantization process is controllable by a quantization parameter. Here, an amount of compression increases as the value of the quantization parameter rises, and a greater amount of information is lost. The opposite is true.

Moreover, in most image or video coding schemes, the quantization process and an inverse quantization process are controllable by a set of quantization scaling matrix values in addition to the quantization parameter (see PTL 1, for instance). Here, each of frequency coefficients in a two-dimensional transform block can be quantized by using both the quantization parameter and a value corresponding to a quantization scaling matrix. It is to be noted that a "matrix value" refers to a value of each of coefficients constituting a matrix (hereafter the same).

An example of the inverse quantization process can be expressed by the following equation.

$$\text{AbsCoeff}[i][j] = \text{abs}(\text{QuantizedCoeff}[i][j]) \\ * \text{LevelScale} * \text{ScalingMatrix}[i][j] \gg (\text{QShift})$$

Here, LevelScale and QShift are controlled by the quantization parameter. Moreover, ScalingMatrix[i][j] represents quantization scaling matrix values.

In a video coding scheme such as ISO/IES14496-10 (MPEG-4AVC), a quantization scaling matrix can be included and coded in a sequence header or a picture header. Conventionally, quantization scaling matrix values are rearranged in a predetermined order, differences between previous and next quantization scaling matrix values are calculated, and the difference values are included and coded in the sequence header or the picture header.

CITATION LIST

Patent Literature

[PTL 1]
Japanese Unexamined Patent Application Publication No. 2008-193410

SUMMARY OF INVENTION

Technical Problem

One of problems of the conventional techniques is associated with the number of bits required to transmit quantization scaling matrix values in a picture header. In particular, transmitting a large number of quantization scaling matrices in a picture header to a decoder requires a lot of bits, which reduces coding efficiency.

The present invention has been conceived in view of the above problem, and an object of the present invention is to provide an image coding method and an image decoding method which make it possible to code a quantization scaling matrix using a smaller number of bits and decode the coded quantization scaling matrix, respectively.

Solution to Problem

An image decoding method according to an aspect of the present invention is a method of decoding a coded image included in a coded stream. More specifically, the image decoding method includes: obtaining an old quantization scaling matrix which is a decoded quantization scaling matrix and is used for decoding a new quantization scaling matrix; obtaining, from the coded stream, an update parameter indicating an amount of change in the new quantization scaling matrix with respect to the old quantization scaling matrix; decoding the new quantization scaling matrix using the old quantization scaling matrix obtained in the obtaining of an old quantization scaling matrix and the update parameter obtained in the obtaining of an update parameter; and decoding the coded image using the new quantization scaling matrix decoded in the decoding of the new quantization scaling matrix.

As in the above configuration, the new quantization scaling matrix is computed based on the old quantization scaling matrix, and thus it is possible to reduce a greater amount of information to be included in the coded stream than the conventional methods. As a result, the coding efficiency is increased.

Moreover, in the obtaining of an update parameter, a first update parameter and a second update parameter may be obtained from the coded stream, the first update parameter indicating a scale factor of the new quantization scaling matrix with respect to the old quantization scaling matrix, and the second update parameter indicating a degree of variation in values constituting the new quantization scaling matrix. In the decoding of the new quantization scaling matrix, a prediction matrix may be computed using the old quantization scaling matrix, the first update parameter, and the second update parameter, and the new quantization scaling matrix may be decoded using the computed prediction matrix, the prediction matrix resulting from predicting the new quantization scaling matrix.

Moreover, in the obtaining of an update parameter, a delta matrix may be further obtained from the coded stream, the delta matrix being a difference between the new quantization scaling matrix and the prediction matrix. In the decoding of the new quantization scaling matrix, the new quantization scaling matrix may be decoded by adding the prediction matrix and the delta matrix.

As an example, each of the new quantization scaling matrix, the old quantization scaling matrix, the prediction matrix, and the delta matrix may be a matrix containing n values, where n is a natural number equal to or greater than 2. In the decoding of the new quantization scaling matrix, the new quantization scaling matrix may be decoded according to Equation 1, where $M_{new}(i)$ represents the n values constituting the new quantization scaling matrix, $M_{old}(i)$ represents the n values constituting the old quantization scaling matrix, $\Delta M(i)$ represents the n values constituting the delta matrix, $P_1$ represents a first coefficient obtained from the first update parameter, $P_2$ represents a second coefficient obtained from the second update parameter, F represents a coefficient determined for each new quantization scaling matrix, and i=any number from 1 to n.

It is to be noted that the coefficient F may correspond to a direct-current component value of the old quantization scaling matrix. Furthermore, the coefficient F may correspond to an average value of the n values constituting the old quantization scaling matrix.

Moreover, the coded stream may further include an update flag indicating whether or not the coded stream includes the update parameter. In the image decoding method, when a value indicating that the coded stream includes the update parameter is set to the update flag, the new quantization scaling matrix may be decoded.

Moreover, the coded stream may further include an update type flag indicating a coding method for the new quantization scaling matrix. In the image decoding method, when a value indicating that the new quantization scaling matrix is coded using the old quantization scaling matrix is set to the update type flag, the new quantization scaling matrix may be decoded using the old quantization scaling matrix and the update parameter.

Moreover, the coded stream may further include identification information for identifying the old quantization scaling matrix. In the obtaining of an old quantization scaling matrix, among decoded quantization scaling matrices, a quantization scaling matrix identified using the identification information may be obtained as the old quantization scaling matrix.

An image coding method according to an aspect of the present invention is a method of coding an image. More specifically, the image coding method includes: obtaining an old quantization scaling matrix which is a coded quantization scaling matrix and is used for coding a new quantization scaling matrix; computing an update parameter indicating an amount of change in the new quantization scaling matrix with respect to the old quantization scaling matrix; and generating a coded stream including (i) an image coded using the new quantization scaling matrix and (ii) the update parameter computed in the computing.

As in the above configuration, the new quantization scaling matrix is computed based on the old quantization scaling matrix, and thus it is possible to reduce a greater amount of information to be included in the coded stream than the conventional methods. As a result, the coding efficiency is increased.

Moreover, in the computing, a first update parameter and a second update parameter may be computed, the first update parameter indicating a scale factor of the new quantization scaling matrix with respect to the old quantization scaling matrix, and the second update parameter indicating a degree of variation in values constituting the new quantization scaling matrix. In the generating, the first update parameter and the second update parameter may be included in the coded stream.

Moreover, in the computing, a prediction matrix may be computed using the old quantization scaling matrix, the first update parameter, and the second update parameter, and the first update parameter and the second update parameter may be computed so that values of a delta matrix become smallest, the prediction matrix resulting from predicting the new quantization scaling matrix, and the values being a difference between the new quantization scaling matrix and the prediction matrix. In the generating, the delta matrix may be further included in the coded stream. With the above configuration, each value of the delta matrix is allowed to approach 0 as much as possible, and thus the coding efficiency is increased.

Moreover, in the generating, identification information for identifying the old quantization scaling matrix obtained in the obtaining may be included in the coded stream. With this configuration, for instance, it is possible to select an old quantization scaling matrix having the highest correlation with the new quantization scaling matrix.

An image decoding apparatus according to an aspect of the present invention decodes a coded image included in a coded stream. More specifically, the image decoding apparatus includes: a matrix obtaining unit configured to obtain an old quantization scaling matrix which is a decoded quantization scaling matrix and is used for decoding a new quantization scaling matrix; an update parameter obtaining unit configured to obtain, from the coded stream, an update parameter indicating an amount of change in the new quantization scaling matrix with respect to the old quantization scaling matrix; a matrix decoding unit configured to decode the new quantization scaling matrix using the old quantization scaling matrix obtained by the matrix obtaining unit and the update parameter obtained by the update parameter obtaining unit; and an image decoding unit configured to decode the coded image using the new quantization scaling matrix decoded by the matrix decoding unit.

An image coding apparatus according to an aspect of the present invention codes an image. More specifically, the image coding apparatus includes: a matrix obtaining unit configured to obtain an old quantization scaling matrix which is a coded quantization scaling matrix and is used for coding a new quantization scaling matrix; an update parameter computation unit configured to compute an update parameter indicating an amount of change in the new quantization scaling matrix with respect to the old quantization scaling matrix; and a coding unit configured to generate a coded stream including (i) an image coded using the new quantization scaling matrix and (ii) the update parameter computed by said update parameter computation unit.

A computer program according to an aspect of the present invention causes a computer to decode a coded image included in a coded stream. More specifically, the computer program causes the computer to execute: obtaining an old quantization scaling matrix which is a decoded quantization scaling matrix and is used for decoding a new quantization scaling matrix; obtaining, from the coded stream, an update parameter indicating an amount of change in the new quantization scaling matrix with respect to the old quantization scaling matrix; decoding the new quantization scaling matrix using the old quantization scaling matrix obtained in the obtaining of an old quantization scaling matrix and the update parameter obtained in the obtaining of an update parameter; and decoding the coded image using the new quantization scaling matrix decoded in the decoding of the new quantization scaling matrix.

A computer program according to another aspect of the present invention causes a computer to code an image. More specifically, the computer program causes the computer to execute: obtaining an old quantization scaling matrix which is a coded quantization scaling matrix and is used for coding a new quantization scaling matrix; computing an update parameter indicating an amount of change in the new quantization scaling matrix with respect to the old quantization scaling matrix; and generating a coded stream including (i) an image coded using the new quantization scaling matrix and (ii) the update parameter computed in the computing.

An integrated circuit according to an aspect of the present invention decodes a coded image included in a coded stream. More specifically, the integrated circuit includes: a matrix obtaining unit configured to obtain an old quantization scaling matrix which is a decoded quantization scaling matrix and is used for decoding a new quantization scaling matrix; an update parameter obtaining unit configured to obtain, from the coded stream, an update parameter indicating an amount of change in the new quantization scaling matrix with respect to the old quantization scaling matrix; a matrix decoding unit configured to decode the new quantization scaling matrix using the old quantization scaling matrix obtained by the matrix obtaining unit and the update parameter obtained by the update parameter obtaining unit; and an image decoding unit configured to decode the coded image using the new quantization scaling matrix decoded by the matrix decoding unit.

An integrated circuit according to another aspect of the present invention codes an image. More specifically, the integrated circuit includes: a matrix obtaining unit configured to obtain an old quantization scaling matrix which is a coded quantization scaling matrix and is used for coding a new quantization scaling matrix; an update parameter computation unit configured to compute an update parameter indicating an amount of change in the new quantization scaling matrix with respect to the old quantization scaling matrix; and a coding unit configured to generate a coded stream including (i) an image coded using the new quantization scaling matrix and (ii) the update parameter computed by said update parameter computation unit.

Advantageous Effects of Invention

The present invention makes it possible to reduce the amount of coded data of quantization scaling matrix values, and thus the coding efficiency is increased.

BRIEF DESCRIPTION OF DRAWINGS

FIG. 4A is a diagram showing an example of an update parameter set in a sequence header.

FIG. 4B is a diagram showing an example of an update parameter set in a picture header.

DESCRIPTION OF EMBODIMENTS

Embodiment 1

The following describes an image decoding apparatus and an image coding apparatus according to Embodiment 1 with reference to the drawings.

Figure 1:
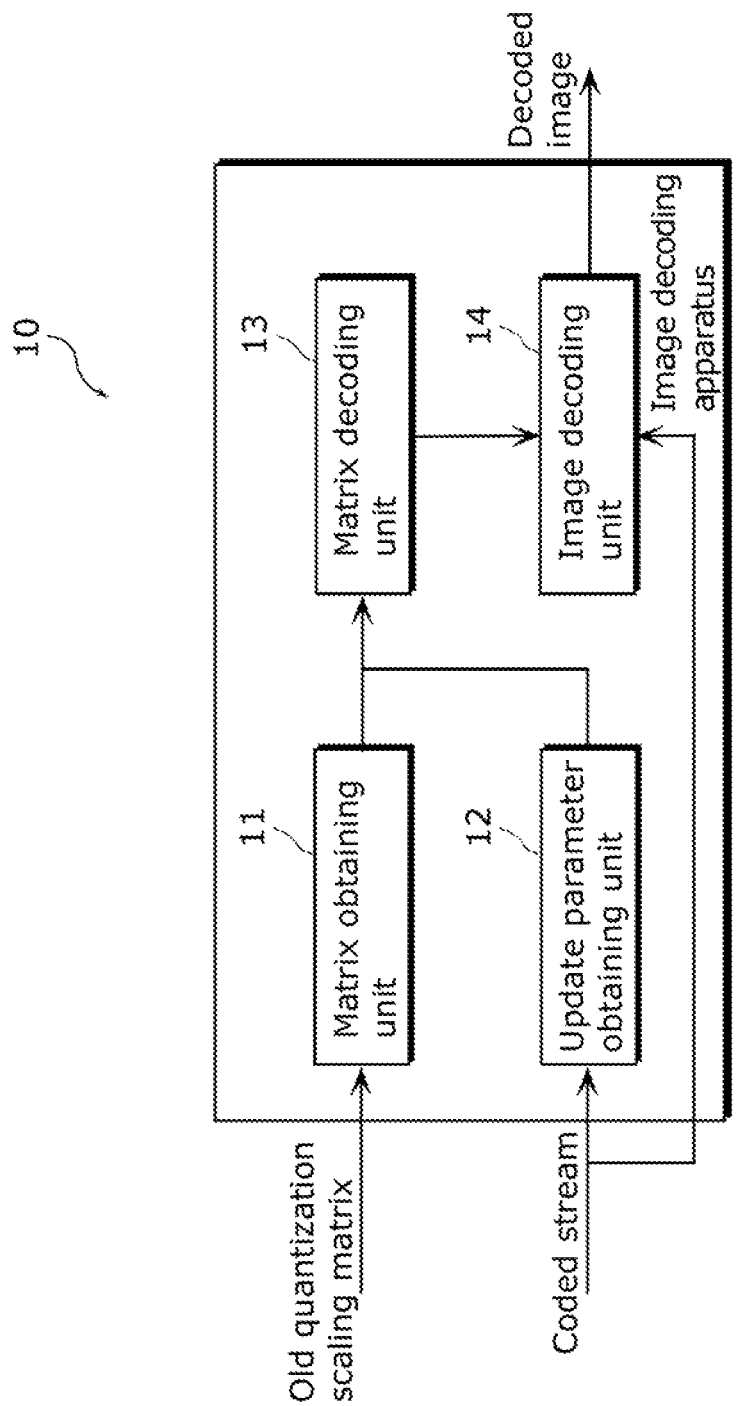
FIG. 1 is a functional block diagram showing an image decoding apparatus according to an embodiment of the present invention.

As shown in FIG. 1, an image decoding apparatus 10 includes a matrix obtaining unit 11, an update parameter obtaining unit 12, a matrix decoding unit 13, and an image decoding unit 14. The image decoding apparatus 10 is an apparatus which decodes a coded image included in a coded stream.

The matrix obtaining unit 11 obtains an old quantization scaling matrix which is a decoded quantization scaling matrix and is used for decoding a new quantization scaling matrix. Then, the matrix obtaining unit 11 outputs the obtained old quantization scaling matrix to the matrix decoding unit 13. It is to be noted that the decoded quantization scaling matrix is stored in a memory (not shown) of the image decoding apparatus 10.

A method of selecting an old quantization scaling matrix is not particularly limited, and, for instance, a most recently decoded quantization scaling matrix may be selected. Alternatively, when identification information for identifying an old quantization scaling matrix is included in a coded stream, the old quantization scaling matrix may be selected based on the identification information. A default quantization scaling matrix defined by standards may be selected instead.

The update parameter obtaining unit 12 obtains from the coded stream an update parameter indicating an amount of change in the new quantization scaling matrix with respect to the old quantization scaling matrix. Then, the update parameter obtaining unit 12 outputs the obtained update parameter to the matrix decoding unit 13.

Here, the obtained update parameter includes: a first update parameter indicating a scale factor of the new quantization scaling matrix with respect to the old quantization scaling matrix; a second update parameter indicating a degree of variation in values constituting the new quantization scaling matrix; and a delta matrix which is a difference between the new quantization scaling matrix and a prediction matrix (to be described later).

The matrix decoding unit 13 decodes the new quantization scaling matrix using the old quantization scaling matrix obtained by the matrix obtaining unit 11 and the update parameter obtained by the update parameter obtaining unit 12. Then, the matrix decoding unit 13 outputs the decoded new quantization scaling matrix to the image decoding unit 14.

More specifically, the matrix decoding unit 13 computes, using the old quantization scaling matrix and the first and second update parameters, the prediction matrix resulting from predicting the new quantization scaling matrix. Then, the matrix decoding unit 13 decodes the new quantization scaling matrix by summing the prediction matrix and the delta matrix.

The image decoding unit 14 decodes the coded image included in the coded stream, using the new quantization scaling matrix decoded by the matrix decoding unit 13, and outputs the decoded image.

Figure 2:
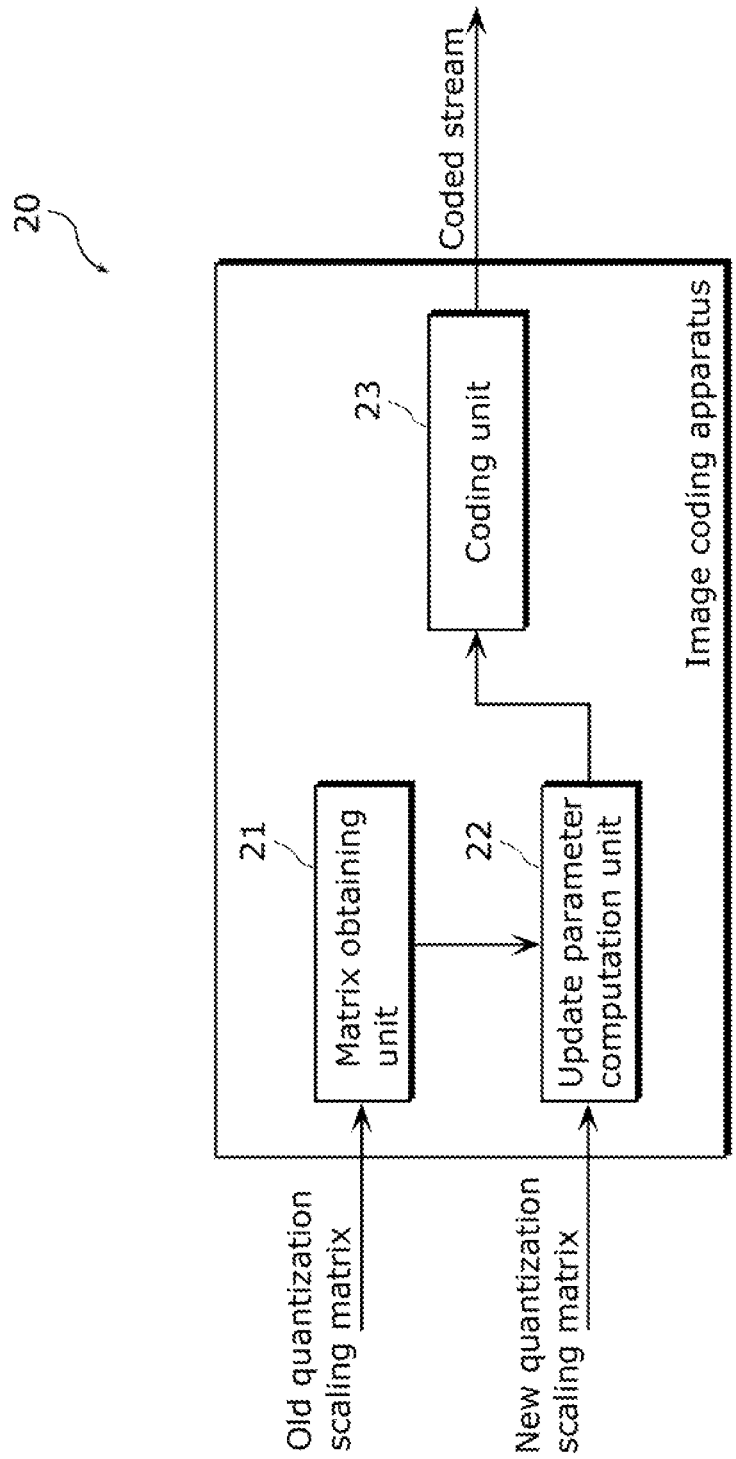
FIG. 2 is a functional block diagram showing an image coding apparatus according to the embodiment of the present invention.

As shown in FIG. 2, an image coding apparatus 20 includes a matrix obtaining unit 21, an update parameter computation unit 22, and a coding unit 23. The image coding apparatus 20 is an apparatus which codes an image.

The matrix obtaining unit 21 obtains an old quantization scaling matrix which is a coded quantization scaling matrix and is used for coding a new quantization scaling matrix. Then, the matrix obtaining unit 21 outputs the obtained old quantization scaling matrix to the update parameter computation unit 22. It is to be noted that the coded quantization scaling matrix is stored in a memory (not shown) of the image coding apparatus 20.

The method of selecting an old quantization scaling matrix is not particularly limited, and, for instance, a most recently coded quantization scaling matrix may be selected. Alternatively, a quantization scaling matrix having a high correlation with the new quantization scaling matrix may be selected. In this case, it is necessary to include in the coded stream identification information for identifying the selected quantization scaling matrix.

The update parameter computation unit 22 computes an update parameter (a first parameter, a second parameter, a delta matrix, and so on) indicating an amount of change in the new quantization scaling matrix with respect to the old quantization scaling matrix. Then, the update parameter computation unit 22 outputs the computed update parameter to the coding unit 23.

As an example, the delta matrix is a difference between the new quantization scaling matrix and a prediction matrix resulting from predicting the new quantization scaling matrix using the old quantization scaling matrix and the first and second parameters. Then, the update parameter computation unit 22 computes the first and second update parameters so that the values of the delta matrix become smallest.

The coding unit 23 generates and outputs a coded stream including the image coded using the new quantization scaling matrix and the update parameter computed by the update parameter computation unit 22. Moreover, the coding unit 23 may include in the coded stream the identification information for identifying the old quantization scaling matrix.

Figure 3:
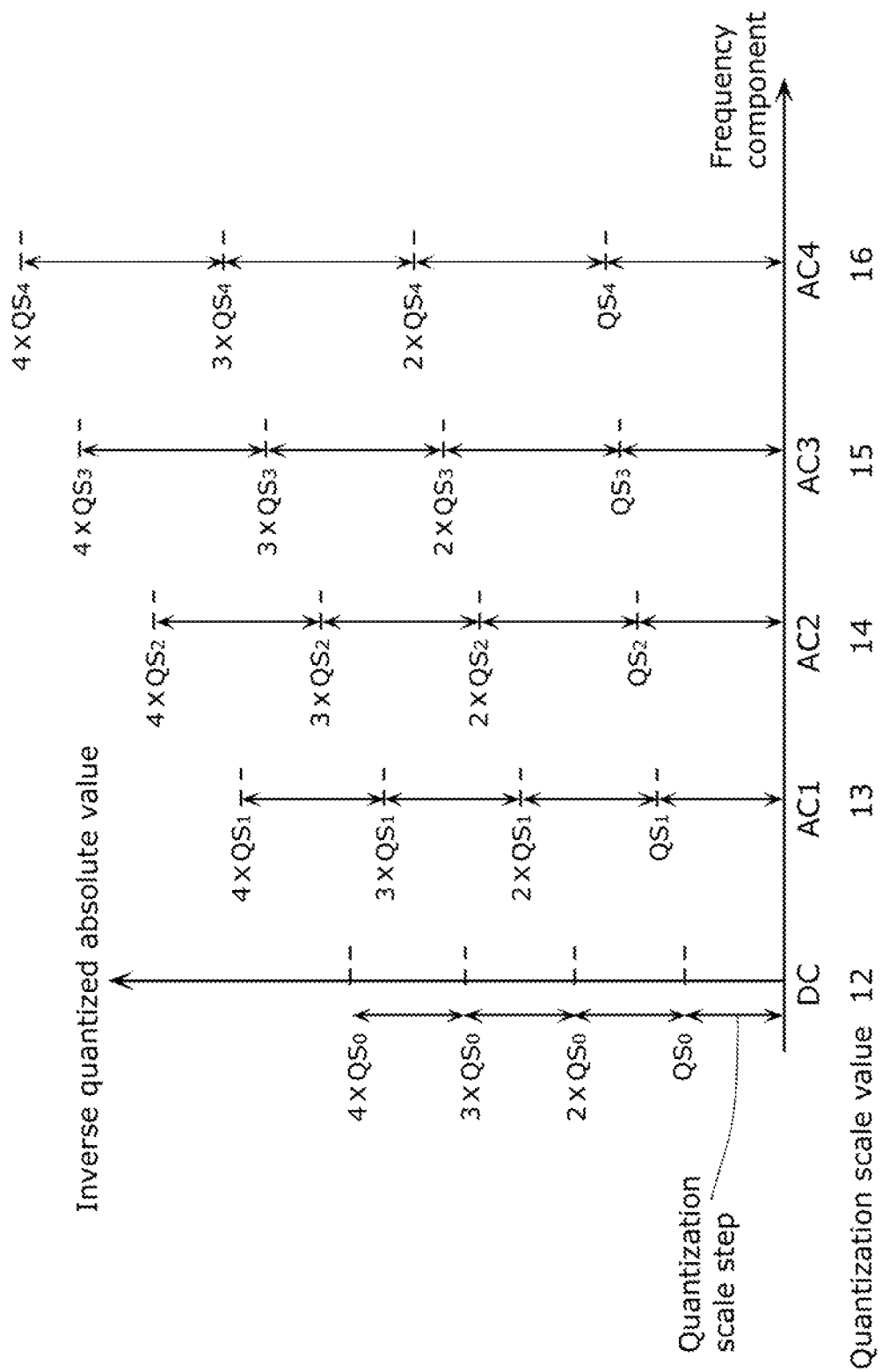
FIG. 3 is a graph showing a relationship between a quantization scaling matrix value and an inverse quantized absolute value.

FIG. 3 is a graph showing a relationship between a quantization scaling matrix value and an inverse quantized absolute value. As shown in FIG. 3, a quantization scale step increases as a quantization scaling matrix value rises. The opposite is true.

Each of FIGS. 4A and 4B is a diagram showing an example of parameters which are included in a picture header or a sequence header and are used for updating a quantization scaling matrix.

As shown in FIG. 4A, for example, it is possible to include an update flag (D202), an update denominator (D204), and an update parameter (D206) in a sequence header (D200). Likewise, as shown in FIG. 4B, for example, it is possible to include an update flag (D202), an update denominator (D204), and an update parameter (D206) in a picture header (D214).

Each of the update flags (D202 and D208) is a flag indicating whether or not information for decoding the new quantization scaling matrix, that is, the update parameter is included in a corresponding one of the headers. For instance, when the update flags (D202 and D208) indicate 1, the update denominators (D204 and D210) and the update parameters (D206 and D212) may be set subsequently. Each of the update denominators (D204 and D210) is used for determining a rate of change at the time of updating the quantization scaling matrix.

Figure 5:
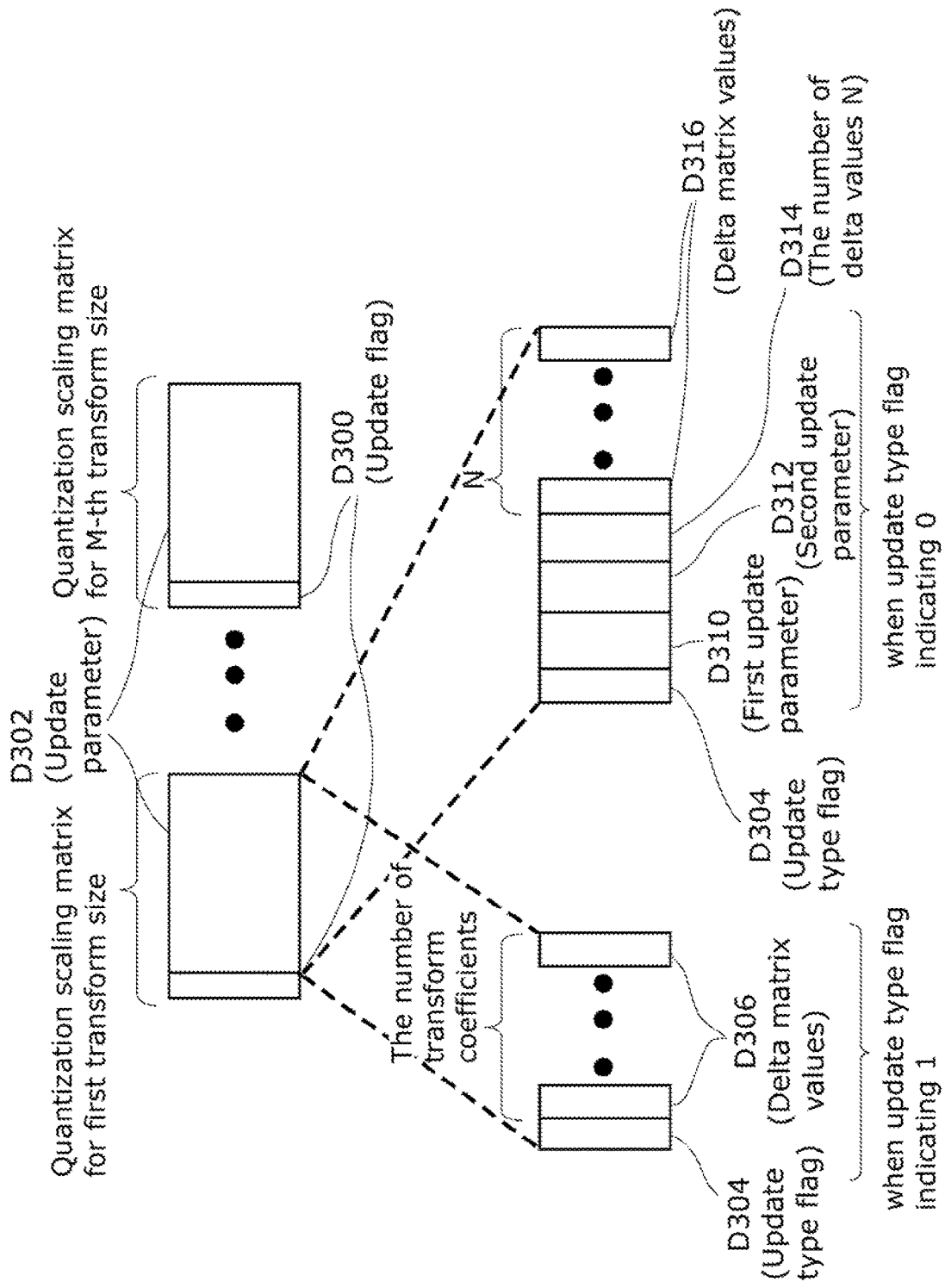
FIG. 5 is a diagram showing two types of update parameters coded in a picture header or a sequence header.

FIG. 5 is a diagram showing two types of update parameters coded in the picture header or the sequence header (hereafter the headers are referred to as "header"). The update parameter (D302) is prepared for each of M transform sizes as shown in FIG. 5, and each of the update parameters includes an update flag (D300) and an update type flag (D304).

The update flag (D300) indicates whether or not quantization scaling matrix values for a corresponding transform size are updated. The update type flag (D304) is a flag indicating a method of coding a new quantization scaling matrix.

For instance, when the update type flag (D304) indicates 0, it is indicated that the new quantization scaling matrix is coded using the old quantization scaling matrix (hereafter referred to as a "first method"). In this case, as shown by the lower right of FIG. 5, a first update parameter (D310), a second update parameter (D312), the number of delta matrix values (D314), and subsequent delta matrix values (D316) are coded in the header.

On the other hand, when the update type flag (D304) indicates 1, it is indicated that the new quantization scaling matrix is coded without using the old quantization scaling matrix (hereafter referred to as a "second method"). In this case, as shown by the lower left of FIG. 5, delta matrix values (D306) are coded in the header. Similar to the conventional method in which the quantization scaling matrix is coded, the values constituting the quantization scaling matrix may be arranged in a predetermined order and difference values between previous and next values are used as the delta matrix values (D306).

Figure 6:
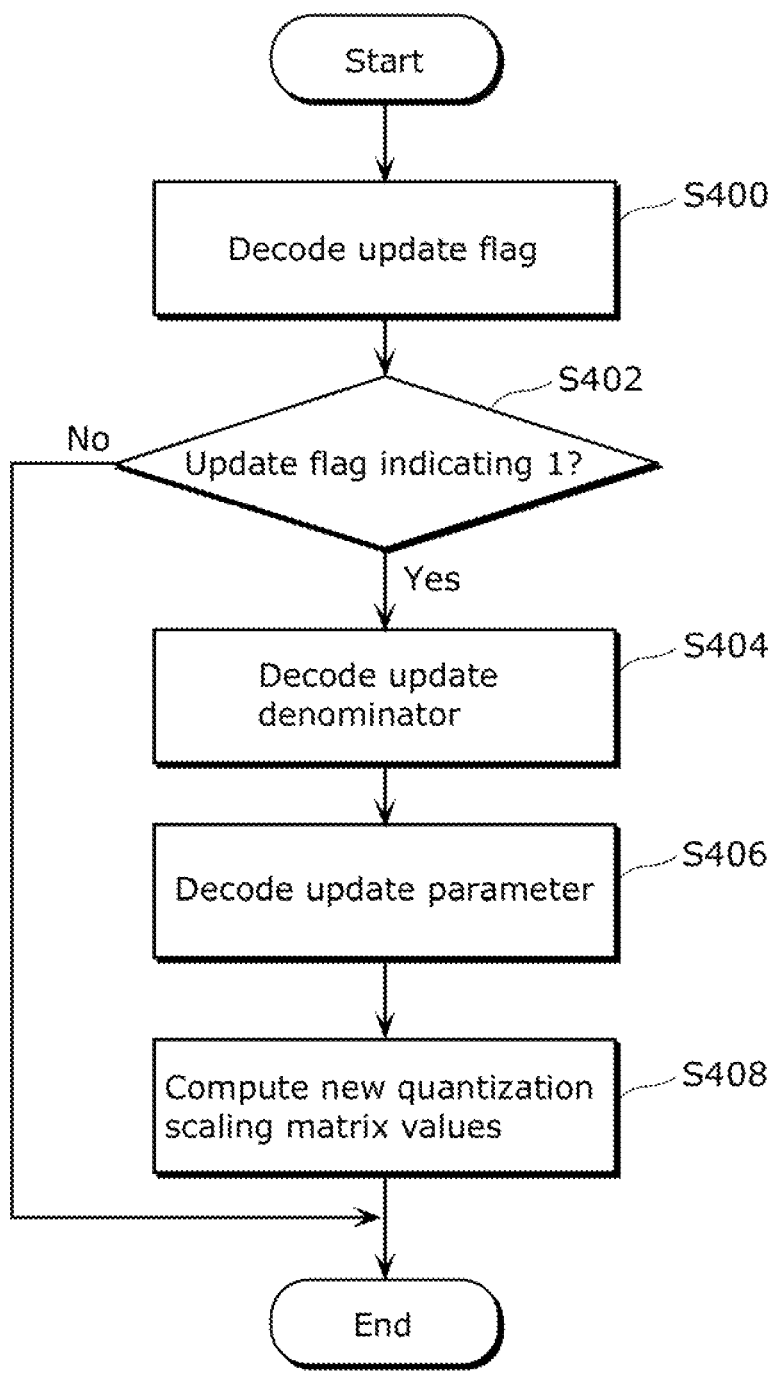
FIG. 6 is a flow chart showing an example of a process of decoding quantization scaling matrix values.

FIG. 6 is a flow chart showing a process of decoding an update parameter in a header.

First, the image decoding apparatus 10 decodes an update flag (D202 or D208) in the header (S400), and checks the value of the update flag (S402).

Next, when the value of the update flag is 1 (Yes in S402), the image decoding apparatus 10 decodes an update denominator (D204 or D210) (S404). The update denominator is, for example, used for determining the rate of change at the time of updating the quantization scaling matrix values. Then, the image decoding apparatus 10 decodes an update parameter (D206 or D212) (S406). Subsequently, the image decoding apparatus 10 computes new quantization scaling matrix values (S408).

Figure 7:
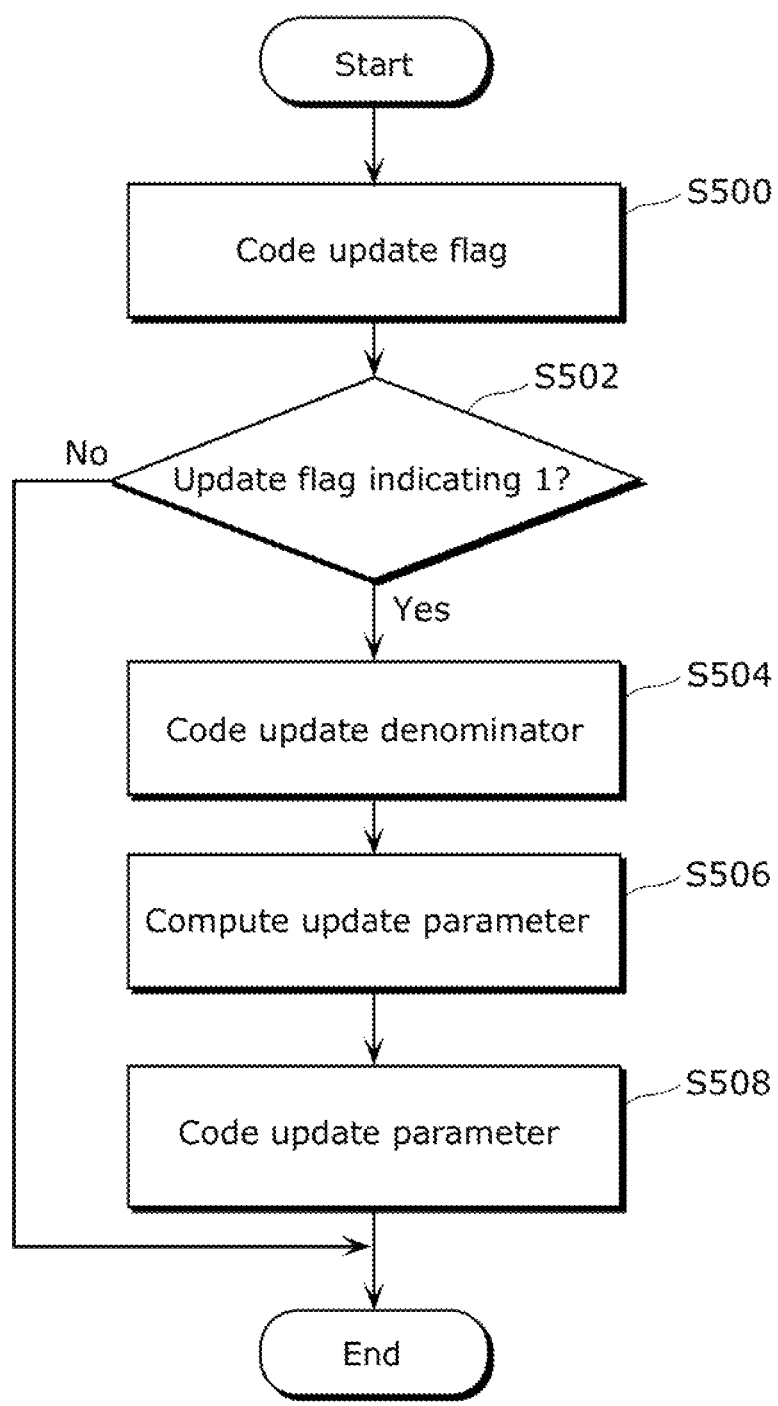
FIG. 7 is a flow chart showing an example of a process of coding quantization scaling matrix values.

FIG. 7 is a flow chart showing a process of coding an update parameter in a header.

First, the image coding apparatus 20 codes an update flag (S500). Information indicating whether or not an update parameter for generating a new quantization scaling matrix is included in the header is set to the update flag.

Next, when the value of the update flag is 1 (Yes in S502), the image coding apparatus 20 codes an update denominator (S504). Then, the image coding apparatus 20 computes the update parameter for generating the new quantization scaling matrix (S506). Subsequently, the image coding apparatus 20 codes the computed update parameter and includes the coded update parameter in a coded stream (S508).

Figure 8:
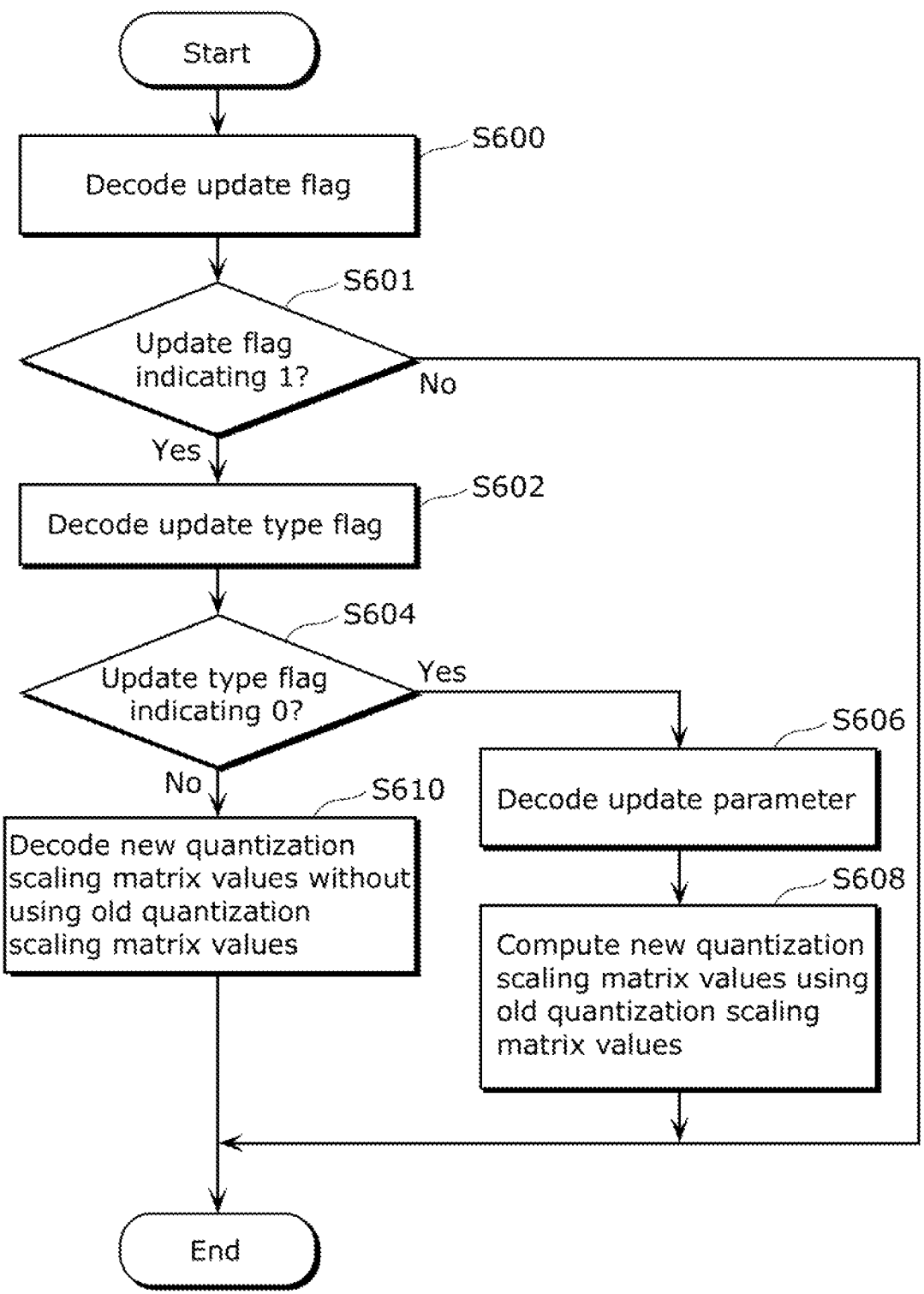
FIG. 8 is a flow chart showing an example of a decoding process in which quantization scaling matrix values for a one-block transform size are updated.

FIG. 8 is a flow chart illustrating a decoding process in which quantization scaling matrix values for a one-block transform size are updated.

First, the image decoding apparatus 10 decodes an update flag (D300) in a header (S600). Next, when the value of the update flag is 1 (Yes in S601), the image decoding apparatus 10 decodes an update type flag (D304) in the header (S602).

Subsequently, when the update type flag indicates 0 (Yes in S604), the image decoding apparatus 10 decodes an update parameter (D302) in the header (S606), and computes new quantization scaling matrix values using old quantization scaling matrix values according to the first method (S608).

On the other hand, when the update type flag indicates 1 (No in S604), the image decoding apparatus 10 decodes the new quantization scaling matrix values without using the old quantization scaling matrix values according to the second method (S610).

Figure 9:
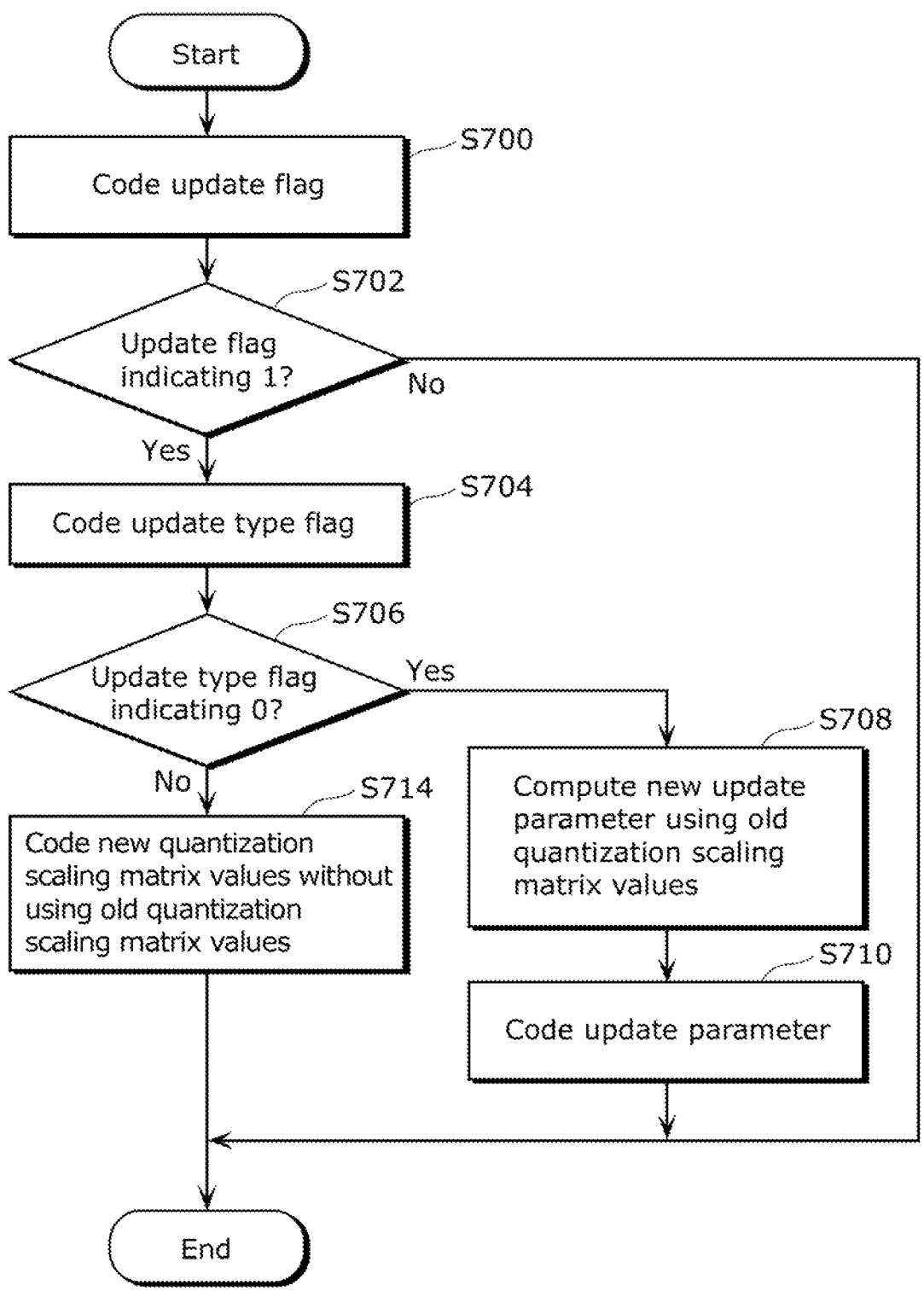
FIG. 9 is a flow chart showing an example of a coding process in which quantization scaling matrix values for a one-block transform size are updated.

FIG. 9 is a flow chart illustrating a coding process in which quantization scaling matrix values for a one-block transform size are updated. First, the image coding apparatus 20 codes an update flag set by the image coding apparatus 20 (S700).

Next, when the value of the update flag is 1 (Yes in S702), the image coding apparatus 20 codes an update type flag set by the image coding apparatus 20 (S704). Subsequently, when the value of the update type flag is 0 (Yes in S706), the image coding apparatus 20 computes an update parameter using old quantization scaling matrix values (S708), and codes the computed update parameter (S710).

On the other hand, when the value of the update type flag is 1 (No in S706), the image coding apparatus 20 codes new quantization scaling matrix values without using the old quantization scaling matrix values (S714).

Figure 10:
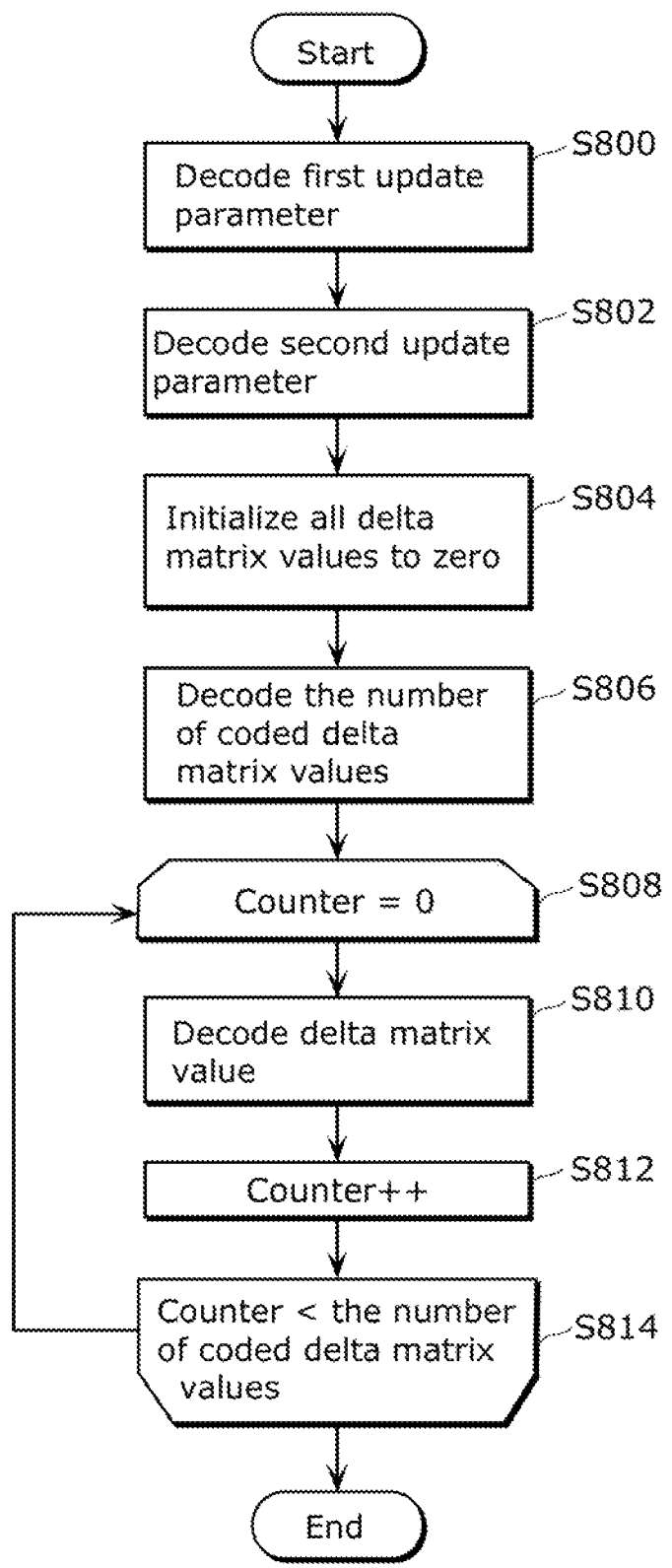
FIG. 10 is a flow chart showing an example of a process of decoding an update parameter.

FIG. 10 is a flow chart illustrating a process of decoding an update parameter.

First, the image decoding apparatus 10 decodes a first update parameter and a second update parameter using information in a header (S800 to S802).

Next, the image decoding apparatus 10 initializes all delta matrix values to zero (S804). Then, the image decoding apparatus 10 decodes the number of coded delta matrix values in the header (S806). Finally, the image decoding apparatus 10 decodes the delta matrix values (S808 to S814).

Here, the number of delta matrix values that can be decoded is based on the number of decoded delta matrix values among the coded delta matrix values. The delta matrix values are arranged in each transform block in a predetermined scanning order, e.g. a zigzag scanning order, and represent delta matrix values corresponding to a range from a low frequency component to a high frequency component of a two-dimensional transform block. The scanning order differs depending on a transform block size. For example, a scanning order in the case of 8×2 blocks is different from a scanning order in the case of 2×8 blocks.

Figure 11:
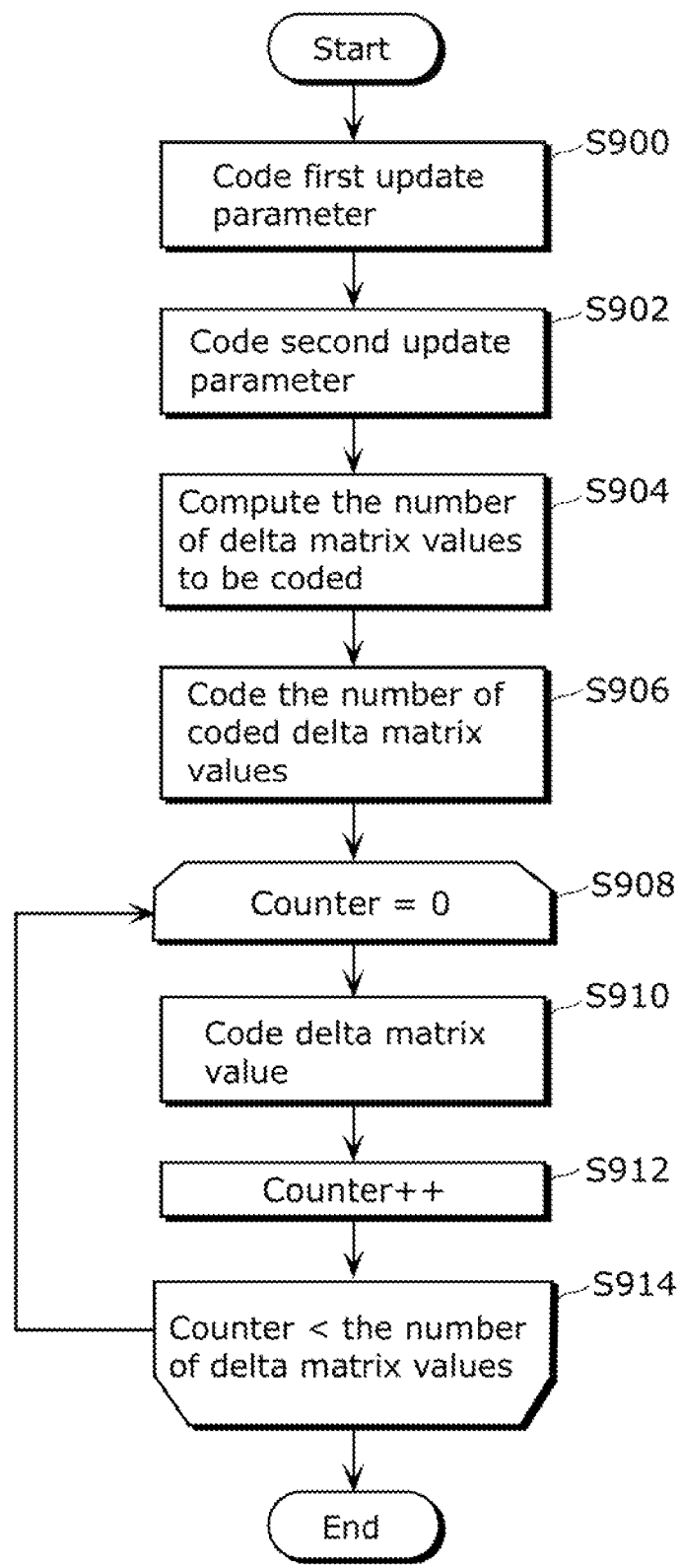
FIG. 11 is a flow chart showing an example of a process of coding an update parameter.

FIG. 11 is a flow chart illustrating a process of coding an update parameter.

First, the image coding apparatus 20 codes a first update parameter and a second update parameter (S900 to S902).

Next, the image coding apparatus 20 computes the number of delta matrix values to be coded (S904). An example of computing the number of the delta matrix values is computing the position of the last non-zero delta matrix value at a scanning position. Subsequently, the image coding apparatus 20 codes the number of the delta matrix values (S906). Finally, the image coding apparatus 20 codes delta matrix values for a transform block size until the final position in a block scanning order becomes equal to the number of the coded delta matrix values (S908 to S914).

Figure 12:
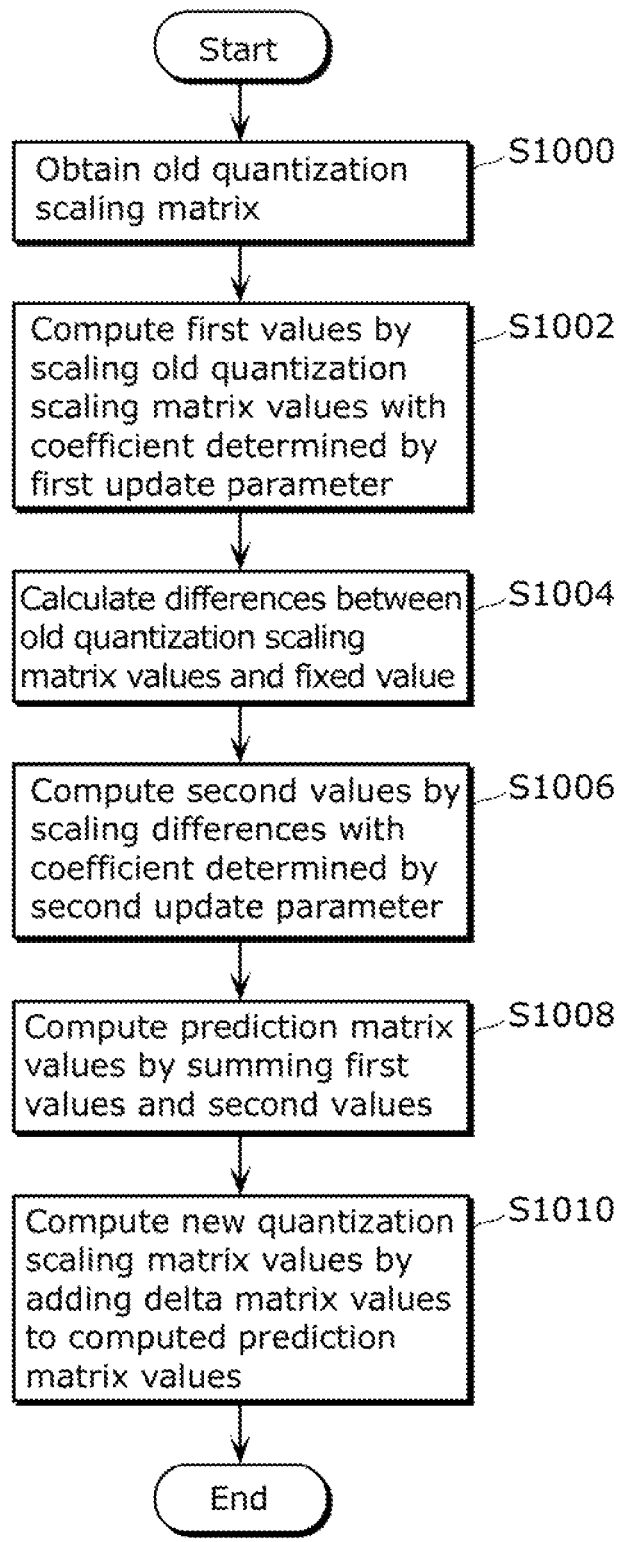
FIG. 12 is a flow chart showing an example of a decoding process in which new quantization scaling matrix values are computed.

FIG. 12 is a flow chart illustrating a decoding process in which new quantization scaling matrix values are computed using the first method.

First, the image decoding apparatus 10 obtains old quantization scaling matrix values (S1000). Next, the image decoding apparatus 10 computes first values by scaling the old quantization scaling matrix values with a first coefficient determined by the first update parameter (D310) shown in FIG. 5 (S1002). Here, the computed first values constitute a matrix having the same number of coefficients as a quantization scaling matrix.

It is to be noted that the first coefficient can be expressed by, for example, the following equation.

First coefficient=(First update parameter+Update denominator)/Update denominator As shown in each of FIGS. 4A and 4B, the update denominator is represented in the header or set to a predetermined value. The predetermined value is, for instance, 16 or 128. However, the first coefficient computed according to the equation may be set as the first update parameter in the header. This eliminates a need for an area in the header in which the update denominator is set as well as a need for the image decoding apparatus 10 to perform the above computation.

Then, the image decoding apparatus 10 calculates difference values between the old quantization scaling matrix values and a fixed value (S1004). Here, the calculated difference values constitute a matrix having the same number of coefficients as the quantization scaling matrix.

It is to be noted that the fixed value may be a value determined at least for each quantization scaling matrix, e.g. a direct current component value (16, for instance) among the old quantization scaling matrix values and an average value (an average scaling matrix value) of all the old quantization scaling matrix values.

Subsequently, the image decoding apparatus 10 computes second values by scaling the difference values calculated in S1004 with a second coefficient determined by the second update parameter (D312) shown in FIG. 5 (S1006). Here, the computed second values constitute a matrix having the same number of coefficients as the quantization scaling matrix.

It is to be noted that the second coefficient can be expressed by, for example, the following equation.

Second coefficient=Second update parameter/Update denominator

As shown in each of FIGS. 4A and 4B, the update denominator is represented in the header or set to a predetermined value. The predetermined value is, for instance, 16 or 128. However, the second coefficient computed according to the equation may be set as the second update parameter in the header. This eliminates the need for the area in the header in which the update denominator is set as well as the need for the image decoding apparatus 10 to perform the above computation.

Next, the image decoding apparatus 10 computes prediction matrix values by summing the first values and the second values (S1008). Here, the computed prediction matrix values constitute a matrix having the same number of coefficients as the quantization scaling matrix.

Then, the image decoding apparatus 10 computes new quantization scaling matrix values by adding delta matrix values to the computed prediction matrix values (adding coefficients to corresponding coefficients) (S1010). The processing shown in FIG. 12 can be expressed as Equation 1 below.

$$M_{new}(i)=(M_{old}(i) \times P_1)+\{(M_{old}(i)-F) \times P_2\}+\Delta M(i) \quad \text{(Equation 1)}$$

Here, $M_{new}(i)$ represents n values constituting a new quantization scaling matrix. $M_{old}(i)$ represents n values constituting an old quantization scaling matrix. $\Delta M(i)$ represents n values constituting a delta matrix. Moreover, $P_1$ represents a first coefficient, $P_2$ represents a second coefficient, and F represents a fixed value. Furthermore, each of the new quantization scaling matrix, the old quantization scaling matrix, the prediction matrix, and the delta matrix is a matrix composed of n (where n is a natural number equal to or greater than 2) values (i.e., i=any number from 1 to n).

Here, the first term of Equation 1 corresponds to the process in S1002 in FIG. 12, and the second term of Equation 1 corresponds to the processes in S1004 to S1006 in FIG. 12. Moreover, the prediction matrix can be computed by summing the first and second terms of Equation 1 (that is, this corresponds to S1008 in FIG. 12). Furthermore, the new quantization scaling matrix can be computed by adding the third term of Equation 1 to the prediction matrix (that is, this corresponds to S1010 in FIG. 12).

Figure 13:
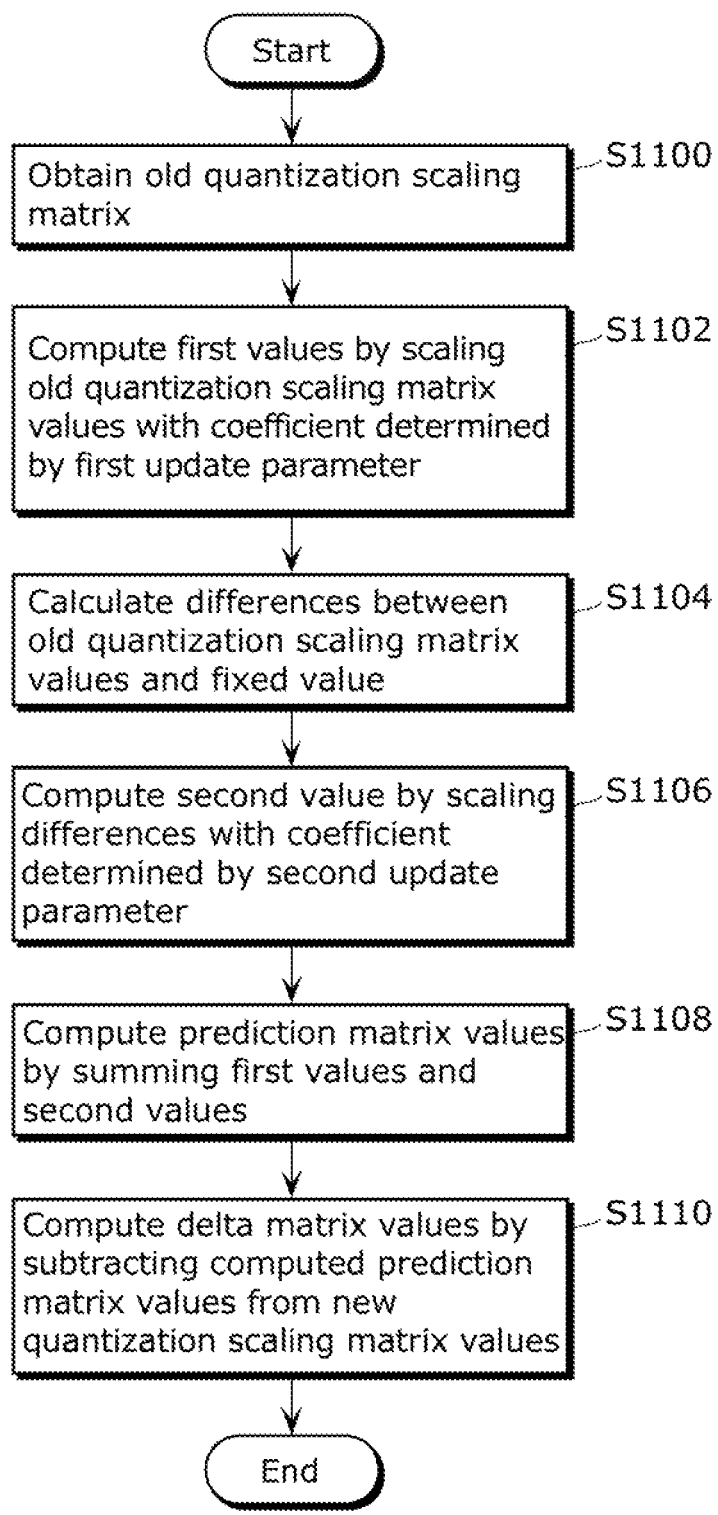
FIG. 13 is a flow chart showing an example of a coding process in which new quantization scaling matrix values are computed.

FIG. 13 is a flow chart illustrating a coding process in which an update parameter is calculated from quantization scaling matrix values.

First, the image coding apparatus 20 determines an old quantization scaling matrix (S1100). Here, the old quantization scaling matrix may be, among quantization scaling matrices, a quantization scaling matrix having the highest correlation with a new quantization scaling matrix.

Next, the image coding apparatus 20 computes first values by scaling the old quantization scaling matrix values with a first coefficient determined by the first update parameter (D310) shown in FIG. 5 (S1102). Here, the computed first values constitute a matrix having the same number of coefficients as the quantization scaling matrix.

It is to be noted that the first coefficient can be expressed by, for example, the following equation.

First coefficient=(First update parameter+Update denominator)/Update denominator As shown in each of FIGS. 4A and 4B, the update denominator is represented in the header or set to a predetermined value. The predetermined value is, for instance, 16 or 128. However, the first coefficient computed according to the equation may be set as the first update parameter in the header. This eliminates a need for an area in the header in which the update denominator is set as well as a need for the image coding apparatus 20 to perform the above computation.

Then, the image coding apparatus 20 calculates difference values between the old quantization scaling matrix values and a fixed value (S1104). Here, the calculated difference values constitute a matrix having the same number of coefficients as the quantization scaling matrix. Moreover, the specific examples of the fixed value have been already described, and thus the description thereof is not repeated.

Subsequently, the image coding apparatus 20 computes second values by scaling the difference values calculated in S1104 with a second coefficient determined by the second update parameter (D312) shown in FIG. 5 (S1106). Here, the computed second values constitute a matrix having the same number of coefficients as the quantization scaling matrix.

It is to be noted that the second coefficient can be expressed by, for example, the following equation.

Second coefficient=Second update parameter/Update denominator

As shown in each of FIGS. 4A and 4B, the update denominator is represented in the header or set to a predetermined value. The predetermined value is, for instance, 16 or 128. However, the second coefficient computed according to the equation may be set as the second update parameter in the header. This eliminates the need for the area in the header in which the update denominator is set as well as the need for the image coding apparatus 20 to perform the above computation.

Next, the image coding apparatus 20 computes prediction matrix values by summing the first values and the second values (S1108). Subsequently, the image coding apparatus 20 computes delta matrix values by subtracting the prediction matrix values computed in S1108 from the new quantization scaling matrix values (S1110). The processing shown in FIG. 13 can be expressed as Equation 2 below.

$$\Delta M(i)=M_{new}(i)-[(M_{old}(i) \times P_1)+\{(M_{old}(i)-F) \times P_2\}] \quad \text{(Equation 2)}$$

The description of each of variables is the same as Equation 1, and thus the description thereof is not repeated.

It is to be noted that each of the values constituting the old quantization scaling matrix is multiplied by the first coefficient $P_1$ in the second term of Equation 2. In other words, the first coefficient $P_1$ is a coefficient for changing an overall scale factor without changing a variation in the values constituting the old quantization scaling matrix.

On the other hand, the fixed value F is subtracted from each value constituting the old quantization scaling matrix and the value resulting from the subtraction is multiplied by the second coefficient $P_2$ in the third term of Equation 2. Here, a value approximate to (typically corresponding to) the direct current component value of the old quantization scaling matrix is set as the fixed value F. In this way, among the values constituting the old quantization scaling matrix, low frequency component values close to the direct current component value approach 0.

As a result, the second coefficient $P_2$ affects, among the values constituting the old quantization scaling matrix, the low frequency component values relatively less and high frequency component values relatively more. In other words, in the computation of the third term of Equation 2, it is possible to increase a variation between low frequency component values and high frequency component values of a new quantization scaling matrix as the value of the second coefficient $P_2$ rises.

Moreover, the delta matrix values approach 0 as each of the values constituting the prediction matrix obtained by summing the second and third terms of Equation 2 is closer to a corresponding value in the new quantization scaling matrix. Thus, the image coding apparatus 10 makes it possible to increase the coding efficiency by selecting an old quantization scaling parameter having the highest correlation with a new quantization scaling parameter and determining the first and second update parameters so that the delta matrix values become smallest (e.g., an error of mean square becomes smallest).

Figure 14:
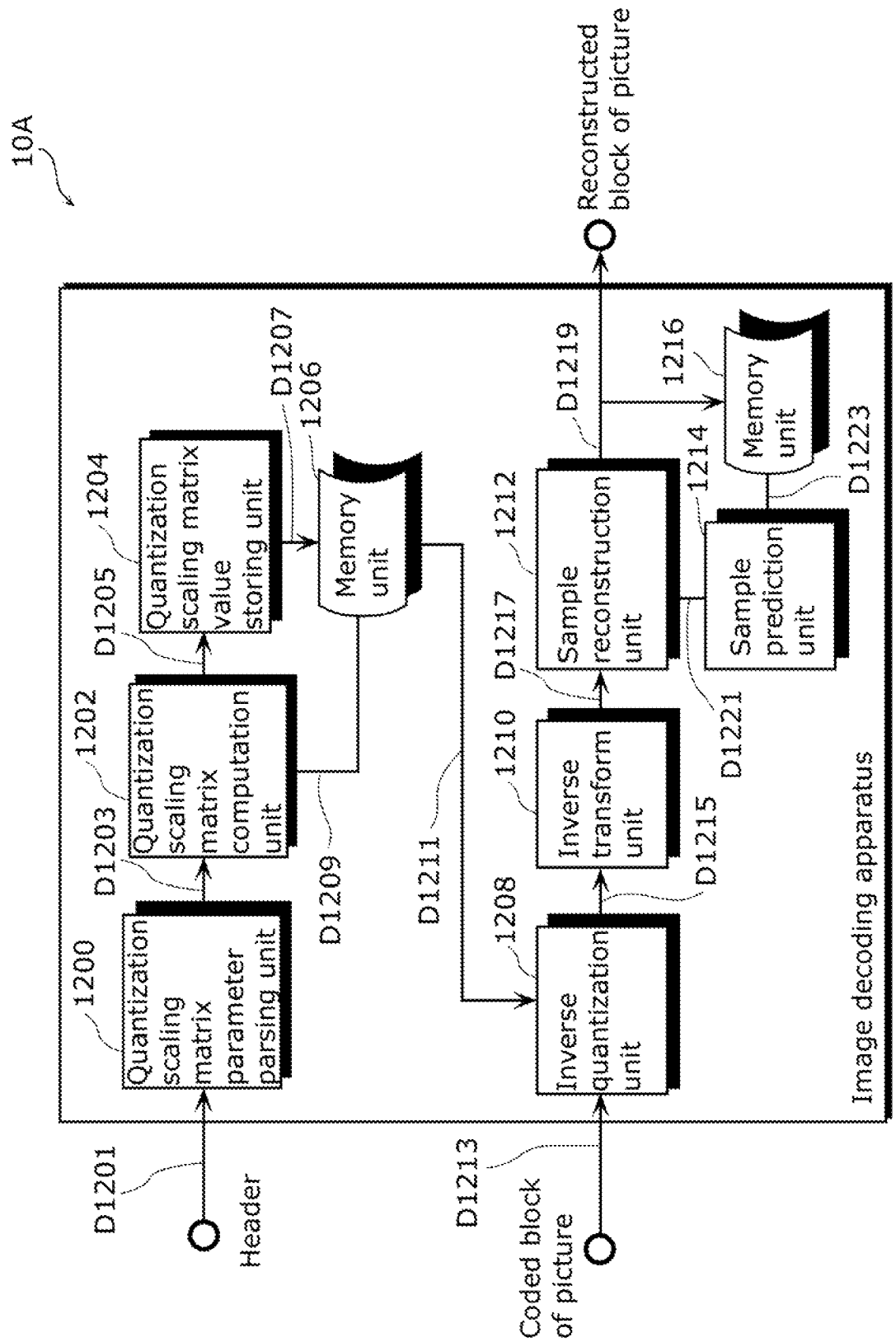
FIG. 14 is a functional block diagram showing an image decoding apparatus according to the embodiment of the present invention.

FIG. 14 is a detailed functional block diagram showing an image decoding apparatus 10A according to this embodiment of the present invention. As shown in FIG. 14, the exemplary image decoding apparatus 10A includes a quantization scaling matrix parameter parsing unit 1200, a quantization scaling matrix value computation unit 1202, a quantization scaling matrix value storing unit 1204, a first memory unit 1206, an inverse quantization unit 1208, an inverse transform unit 1210, a sample reconstruction unit 1212, a sample prediction unit 1214, and a second memory unit 1216.

The quantization scaling matrix parameter parsing unit 1200 reads a header (D1201) from a coded stream, and outputs an update parameter (D1203) to the quantization scaling matrix computation unit 1202. The quantization scaling matrix parameter parsing unit 1200 corresponds to, for instance, the update parameter obtaining unit 12 shown in FIG. 1.

The quantization scaling matrix computation unit 1202 subsequently outputs new quantization scaling matrix values (D1205) to the quantization scaling matrix value storing unit 1204. The quantization scaling matrix computation unit 1202 corresponds to, for example, the matrix obtaining unit 11 and the matrix decoding unit 13 shown in FIG. 1.

Then, the quantization scaling matrix value storing unit 1204 stores the new quantization scaling matrix values (D1207) into the first memory unit 1206.

The inverse quantization unit 1208, the inverse transform unit 1210, the sample reconstruction unit 1212, the memory unit 1216, and the sample prediction unit 1214 form part of the image decoding apparatus 10A, and correspond to, for instance, the image decoding unit 14 shown in FIG. 1.

The inverse quantization unit 1208 obtains coded blocks of a picture (D1213) and the new quantization scaling matrix values (D1211), and performs an inverse quantization process. An inverse quantized coefficient (D1215) is transmitted to the inverse transform unit 1210, and a decode residue (D1217) is sent to the sample reconstruction unit 1212.

The sample reconstruction unit 1212 obtains the decode residue (D1217) and a prediction sample (D1221), and outputs a reconstructed sample (D1219). The reconstructed sample (D1219) is subsequently stored into the second memory unit 1216, and is to be used by the sample prediction unit 1214 to generate the prediction sample (D1221).

Figure 15:
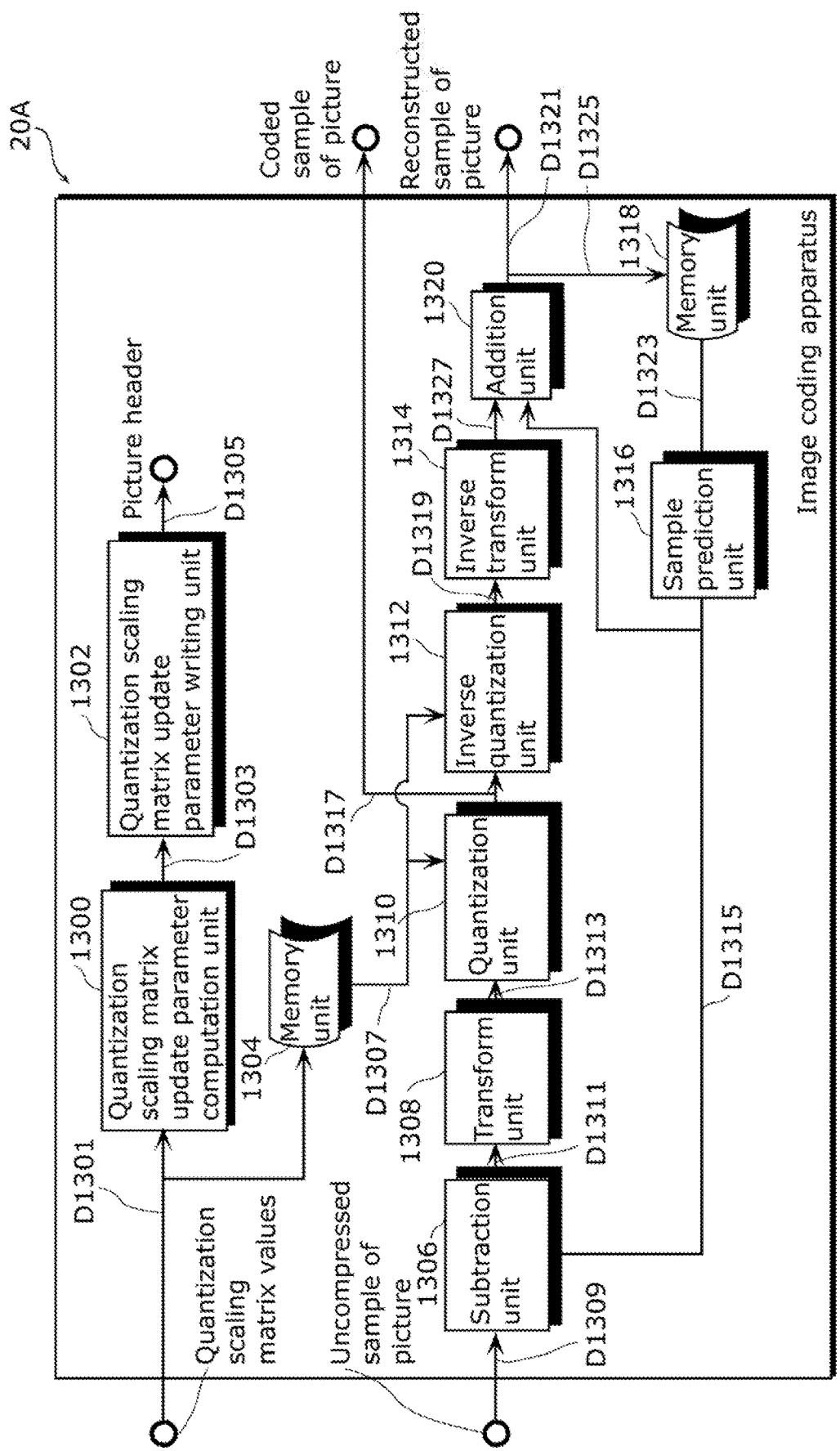
FIG. 15 is a functional block diagram showing an image coding apparatus according to the embodiment of the present invention.

FIG. 15 is a diagram showing an image coding apparatus 20A according to this embodiment of the present invention. As shown in FIG. 15, the exemplary image coding apparatus 20A includes a quantization scaling matrix update parameter computation unit 1300, a quantization scaling matrix parameter writing unit 1302, a first memory 1304, a subtraction unit 1306, a transform unit 1308, a quantization unit 1310, an inverse quantization unit 1312, an inverse transform unit 1314, a second memory unit 1318, an addition unit 1320, and a sample prediction unit 1316.

The subtraction unit 1306, the transform unit 1308, the quantization unit 1310, the inverse quantization unit 1312, the inverse transform unit 1314, the memory unit 1318, the addition unit 1320, and the sample prediction unit 1316 form part of the image coding apparatus 20A, and correspond to, for example, the coding unit 23 shown in FIG. 2.

The quantization scaling matrix update parameter computation unit 1300 obtains, from the first memory unit 1304, new quantization scaling matrix values (D1301) and quantization scaling matrix values, and outputs an update parameter (D1303) to the quantization scaling matrix parameter writing unit 1302. The quantization scaling matrix update parameter computation unit 1300 corresponds to, for instance, the matrix obtaining unit 21 and the update parameter computation unit 22 shown in FIG. 2. The quantization scaling matrix parameter writing unit 1302 writes a quantization scaling matrix update parameter (D1305) into a header. The quantization scaling matrix parameter writing unit 1302 corresponds to, for instance, part of the function of the coding unit 23 shown in FIG. 2.

The subtraction unit 1306 obtains an uncompressed sample of a picture (D1309) and a prediction sample (D1315), and outputs a residual block (D1311) to the transform unit 1308. The transform unit 1308 transforms the residual block (D1311), and outputs a transform coefficient (D1313) to the quantization unit 1310. The quantization unit 1310 reads the transform coefficient (D1313) and the new quantization scaling matrix values (D1307), and outputs a coded sample of the picture (D1317).

The inverse quantization unit 1312 reads the coded sample (D1317), performs an inverse quantization process using the new quantization scaling matrix values (D1307), and outputs an inverse quantization coefficient (D1319) to the inverse transform unit 1314. The inverse transform unit 1314 outputs a reconstruction residue (D1327) to the addition unit 1320. The addition unit 1320 reads the reconstruction residue (D1327) and the prediction sample (D1315), and outputs reconstructed samples of the picture (D1321 and D1325). The reconstructed sample (D1325) is stored into the second memory unit 1318. The sample prediction unit 1316 reads a reconstructed sample (D1323) from the second memory unit 1318, and outputs the prediction sample (D1315).

Embodiment 2

The processing described in Embodiment 1 can be simply implemented in an independent computer system, by recording, in a recording medium, a program for implementing the configurations of the image coding method and the image decoding method described in Embodiment 1. The recording media may be any recording media as long as the program can be recorded, such as a magnetic disk, an optical disk, a magnetic optical disk, an IC card, and a semiconductor memory.

Hereinafter, the applications to the image coding method and the image decoding method described in Embodiment 1 and systems using thereof will be described.

Figure 16:
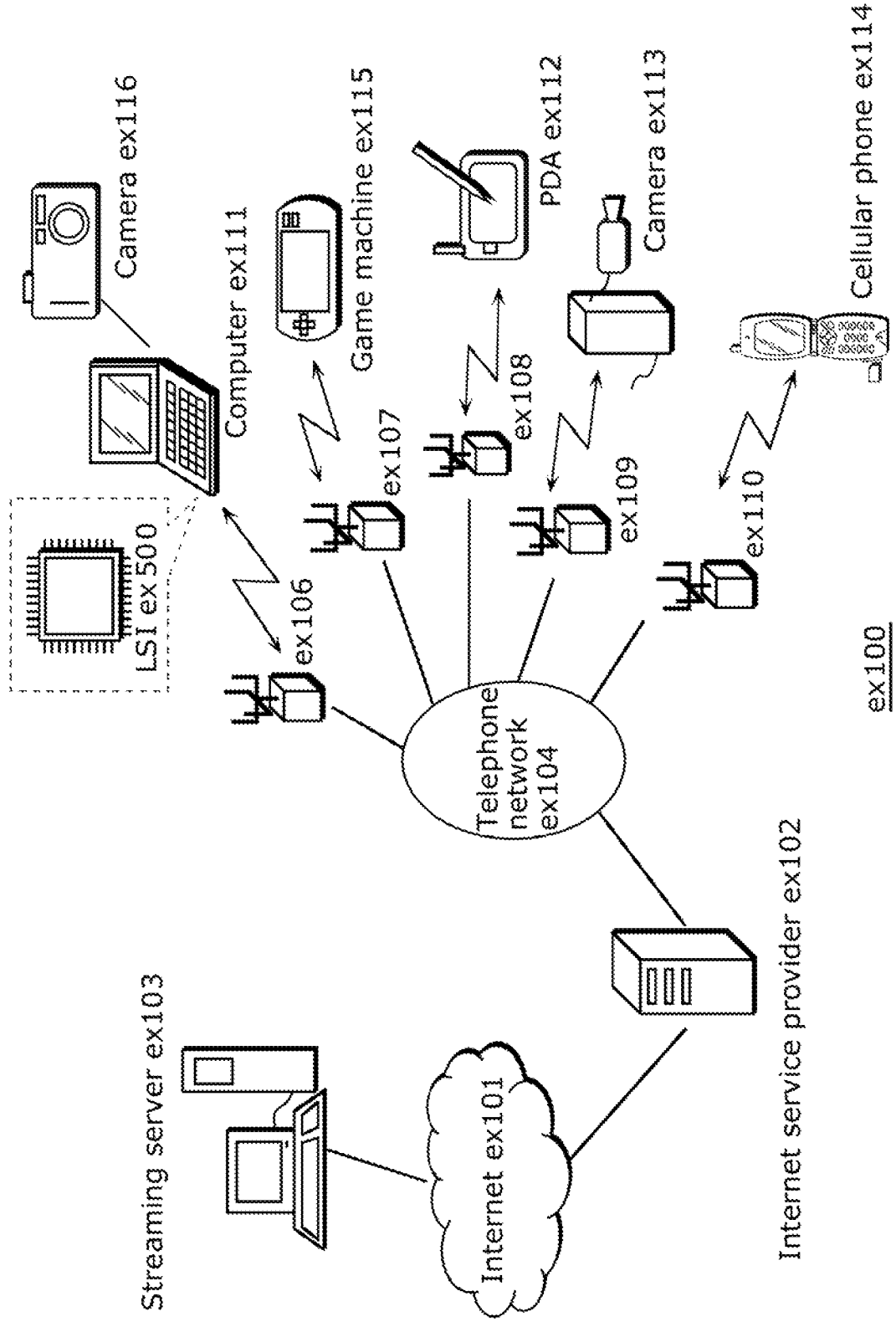
FIG. 16 is a diagram showing an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and/or video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI (Large Scale Integration) ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

The image coding method or the image decoding method described in Embodiment 1 may be used for coding or decoding performed by each of devices constituting the content providing system.

The cellular phone ex114 will be described as the above example.

Figure 17:
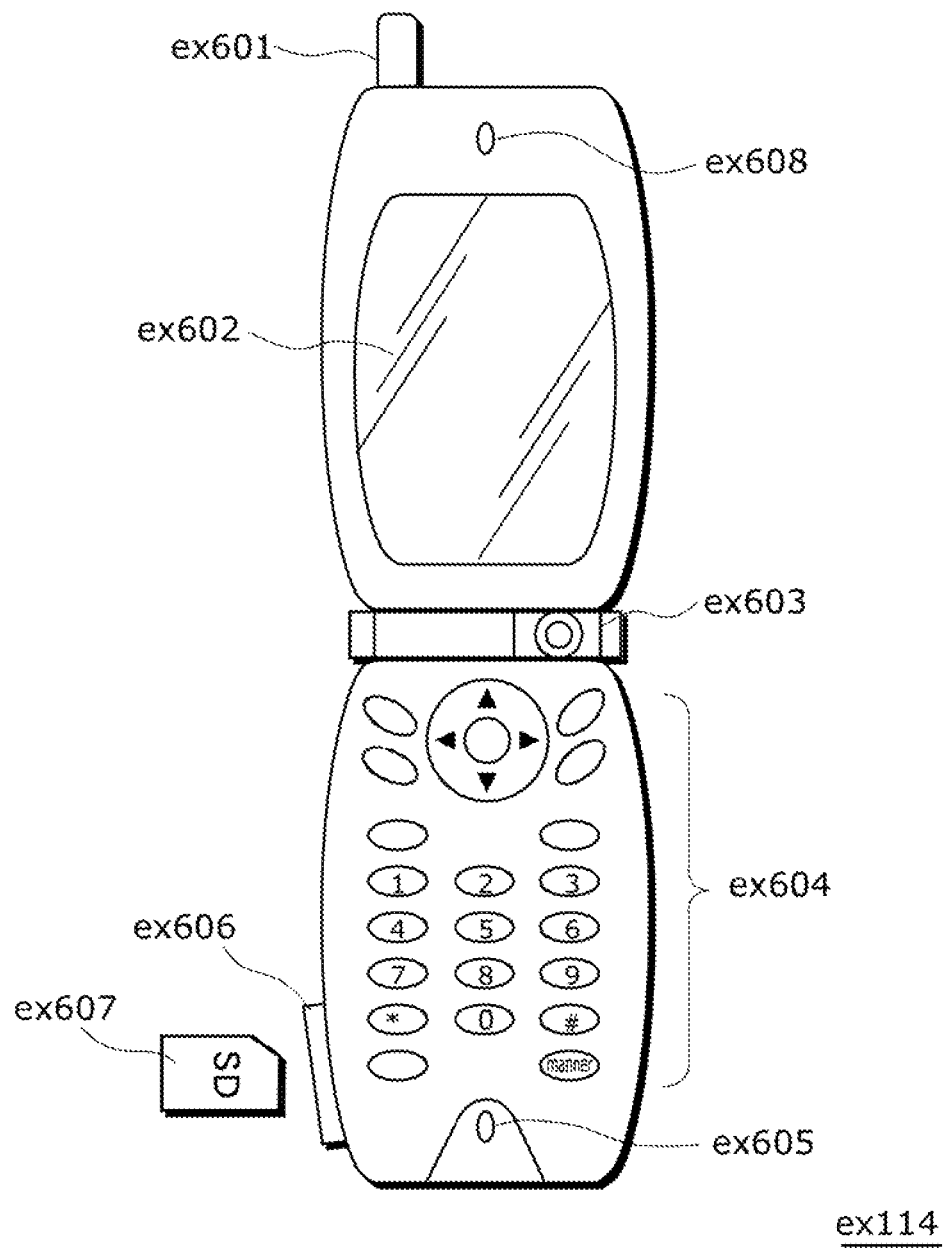
FIG. 17 is an appearance of a cellular phone.

FIG. 17 illustrates the cellular phone ex114 that uses the image coding method and the image decoding method described in Embodiment 1. The cellular phone ex114 includes: an antenna ex601 for transmitting and receiving radio waves through the base station ex110; a camera unit ex603 such as a CCD camera capable of capturing video and still images; a display unit ex602 such as a liquid crystal display for displaying the data such as decoded video captured by the camera unit ex603 or received by the antenna ex601; a main body unit including an operation key unit ex604; an audio output unit ex608 such as a speaker for output of audio; an audio input unit ex605 such as a microphone for input of audio; a recording medium ex607 for storing coded or decoded data such as data of captured video or still images, data of received e-mails, and data of video or still images; and a slot unit ex606 for allowing the recording medium ex607 to be detachable from the cellular phone ex114. The recording medium ex607 is in a plastic case such as an SD card including a flash memory, a type of an EEPROM, which is an electrically rewritable and deletable nonvolatile memory.

Figure 18:
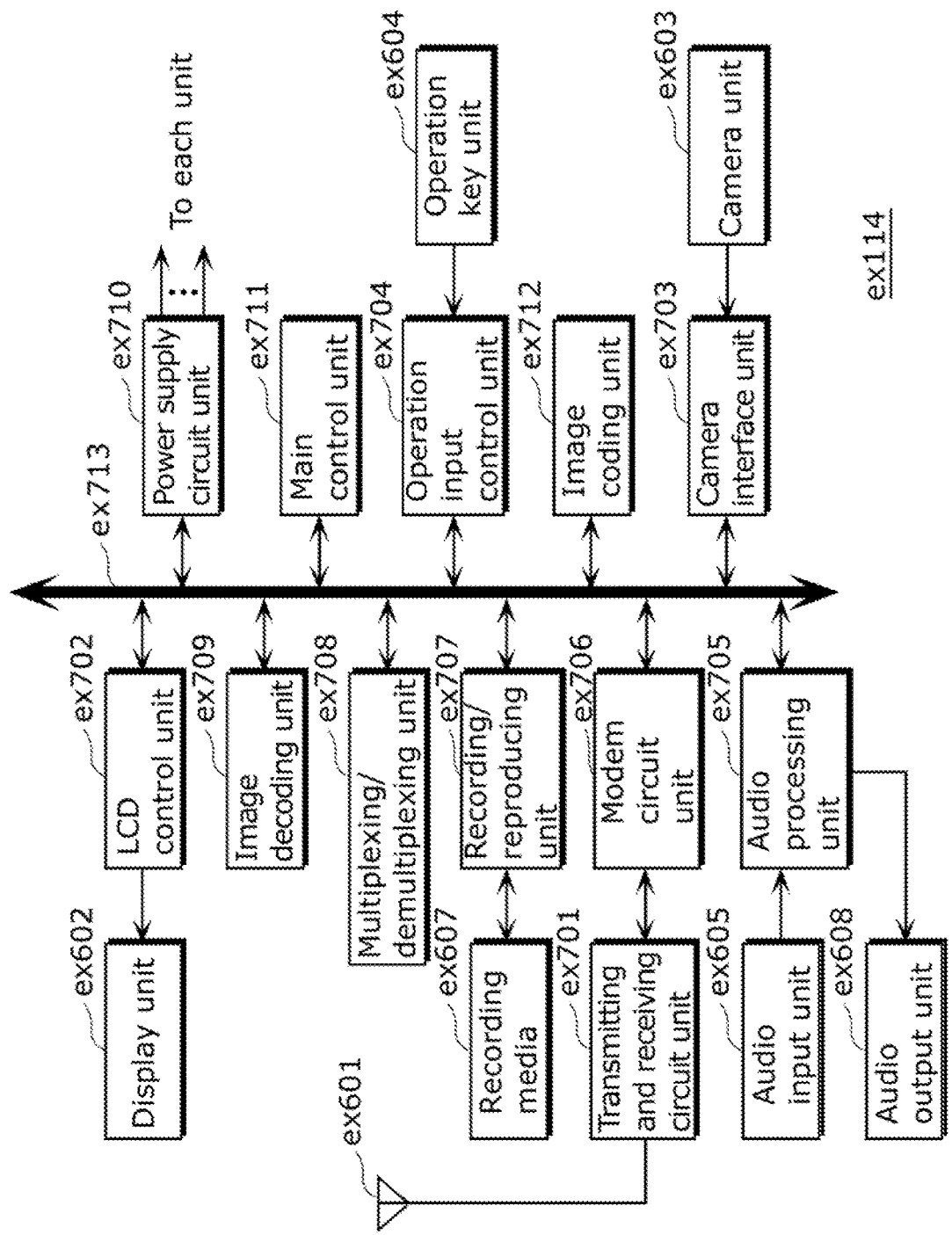
FIG. 18 is a block diagram showing an example of a structure of the cellular phone.

Next, an example of a configuration of the cellular phone ex114 will be described with reference to FIG. 18. In the cellular phone ex114, a main control unit ex711 designed to control overall each unit of the main body including the display unit ex602 as well as the operation key unit ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording and reproducing unit ex707, a modulation/demodulation circuit unit ex706, and an audio signal processing unit ex705.

When a call-end key or a power key is turned ON by a user's operation, the power supply circuit unit ex710 supplies the respective units with power from a battery pack so as to activate the cell phone ex114.

In the cellular phone ex114, the audio signal processing unit ex705 converts the audio signals collected by the audio input unit ex605 in voice conversation mode into digital audio signals under the control of the main control unit ex711 including a CPU, ROM, and RAM. Then, the modulation/demodulation circuit unit ex706 performs spread spectrum processing on the digital audio signals, and a transmitting and receiving circuit unit ex701 performs digital-to-analog conversion and frequency conversion on the data, so as to transmit the resulting data via the antenna ex601. Also, in the cellular phone ex114, the transmitting and receiving circuit unit ex701 amplifies the data received by the antenna ex601 in voice conversation mode and performs frequency conversion and the analog-to-digital conversion on the data. Then, the modulation/demodulation circuit unit ex706 performs inverse spread spectrum processing on the data, and the audio signal processing unit ex705 converts it into analog audio signals, so as to output them via the audio output unit ex608.

Furthermore, when an e-mail in data communication mode is transmitted, text data of the e-mail inputted by operating the operation key unit ex604 and others of the main body is sent out to the main control unit ex711 via the operation input control unit ex704. The main control unit ex711 causes the modulation/demodulation circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is transmitted to the image coding unit ex712 via the camera interface unit ex703. Moreover, when the image data is not transmitted, it is possible to directly display the image data captured by the camera unit ex603 on the display unit ex602 via the camera interface unit ex703 and the LCD control unit ex702.

The image coding unit ex712 includes the image coding apparatus described in the Description. The image coding unit ex712 converts the image data transmitted from the camera unit ex603 into coded image data by performing compression-coding through the coding method used for the image coding apparatus described in Embodiment 1, and transmits the coded image data to the multiplexing/demultiplexing unit ex708. Here, the cellular phone ex114 simultaneously transmits, as digital audio data, audio signals collected by the audio input unit ex605 during capturing by the camera unit ex603, to the multiplexing/demultiplexing unit ex708 via the audio signal processing unit ex705.

The multiplexing/demultiplexing unit ex708 multiplexes the coded image data transmitted from the image coding unit ex712 and the audio data transmitted from the audio signal processing unit ex705, using a predetermined method. Then, the modulation/demodulation circuit unit ex706 performs spread spectrum processing on the multiplexed data, and the transmitting and receiving circuit unit ex701 performs digital-to-analog conversion and frequency conversion on the data so as to transmit the resulting data via the antenna ex601.

When receiving data of a video file which is linked to a Web page and others in data communication mode, the modulation/demodulation circuit unit ex706 performs inverse spread spectrum processing on the data received from the base station ex110 via the antenna ex601, and transmits the resultant multiplexed data to the multiplexing/demultiplexing unit ex708.

Moreover, when multiplexed data received via the antenna ex601 is decoded, the multiplexing/demultiplexing unit ex708 demultiplexes the multiplexed data into an image data bit stream and an audio data bit stream, and transmits the coded image data to the image decoding unit ex709 and the coded audio data to the audio signal processing unit ex705, through the synchronous bus ex713.

The image decoding unit ex709 includes the image decoding apparatus described in the Description. The image decoding unit ex709 generates reproduction video data by decoding a bitstream including image data through a decoding method corresponding to the coding method described in Embodiment 1, and transmits the reproduction video data to the display unit ex602 via the LCD control unit ex702. As a result, for example, video data including a video file linked to a Web page is displayed. Here, after converting audio data into analog audio data, the audio signal processing unit ex705 simultaneously transmits the analog audio data to the audio output unit ex608. Consequently, for example, audio data included in a video file linked to a Web page is reproduced.

Figure 19:
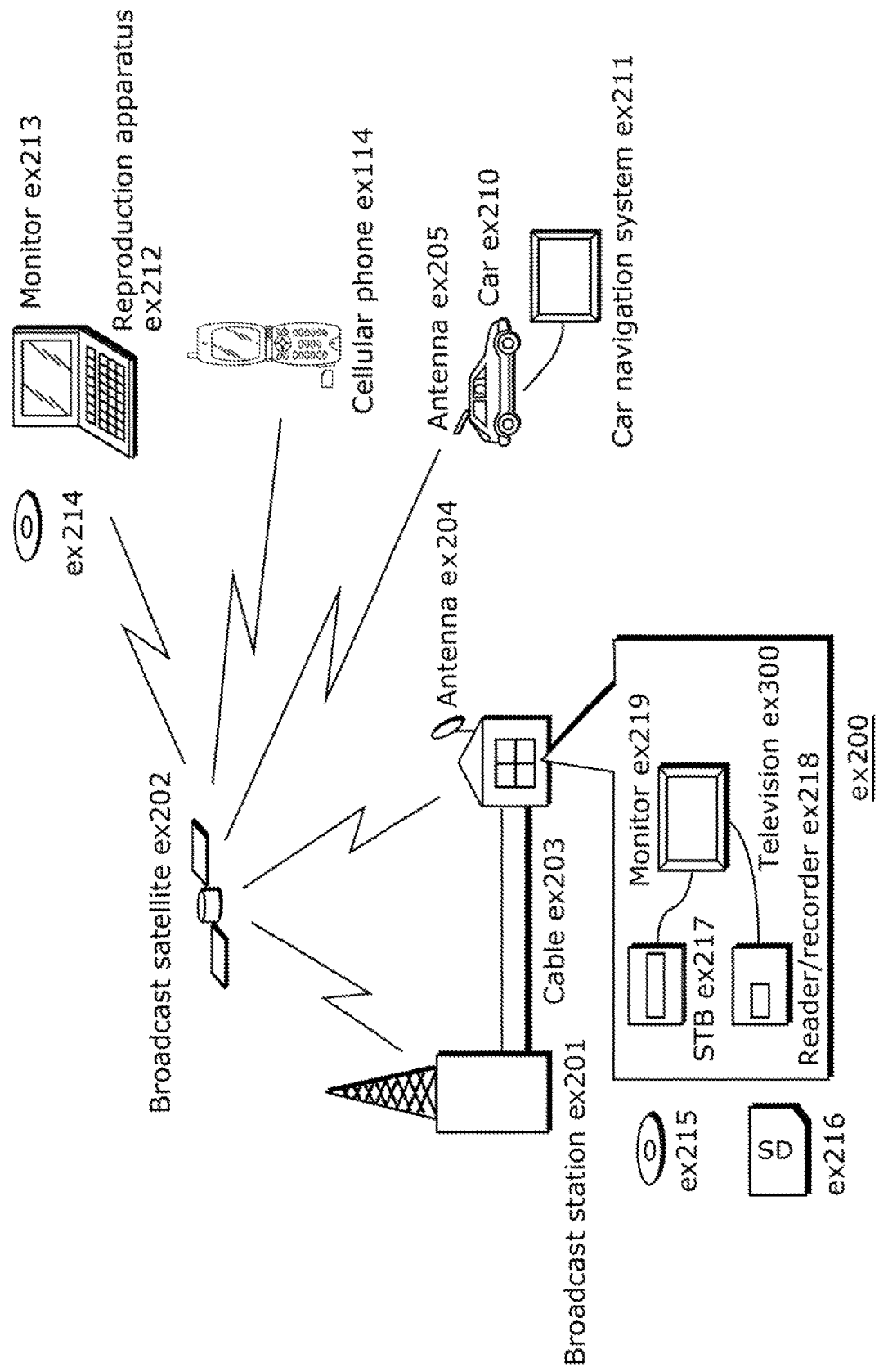
FIG. 19 is a diagram showing an overall configuration of a digital broadcasting system.

It is to be noted that the present invention is not limited to the example of the above system, and, as satellite or terrestrial digital broadcasting has received attention recently, a digital broadcasting system may include at least one of the image coding apparatus and the image decoding apparatus described in Embodiment 1, as shown in FIG. 19. More specifically, a broadcast station ex201 communicates or transmits, via radio waves to a broadcast satellite ex202, a bitstream obtained by multiplexing audio data, video data, or the both. Upon receipt of the bitstream, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received bitstream, and reproduces the decoded data. Moreover, the image decoding apparatus described in Embodiment 1 may be also implemented in a reader/recorder ex218 which reads a bitstream in which image data and audio data recorded on a recording medium ex215 such as a CD and a DVD and a recording medium ex216 are multiplexed, and decodes the bitstream. In this case, the reproduced video signals are displayed on the monitor ex219. It is also possible to implement the image decoding apparatus in the set top box ex217 connected to the cable ex203 for a cable television or to the antenna ex204 for satellite and/or terrestrial broadcasting, so as to reproduce decoded data on the monitor ex219 of the television ex300. The image decoding apparatus may be implemented not in the set top box but in the television ex300. Moreover, in the car ex210 having the antenna ex205, signals can be received from the satellite ex202, a base station, or the like and a video can be reproduced on a display device such as the car navigation system ex211 of the car ex210.

Furthermore, it is possible to implement the image decoding apparatus or the image coding apparatus described in Embodiment 1 also in the reader/recorder ex218 which reads and decodes a coded bitstream in which audio data, video data, or the both recorded on the recording medium ex215 such as a DVD and a BD are multiplexed or codes and records audio data, video data, or the both and as multiplexed data onto the recording medium ex215. In this case, the reproduced video signals are displayed on the monitor ex219. Moreover, the recording medium ex215 on which the coded bitstream is recorded allows other devices, systems, and so on to reproduce video signals. For instance, another reproduction device ex212 reproduces video signals on the monitor ex213, using the recording medium ex214 into which the coded bitstream is copied.

It is also possible to implement the image decoding apparatus in the set top box ex217 connected to the cable ex203 for the cable television or to the antenna ex204 for satellite and/or terrestrial broadcasting, so as to reproduce decoded data on the monitor ex219 of the television ex300. Here, the image decoding apparatus may be implemented not in the set top box but in the television ex300.

Figure 20:
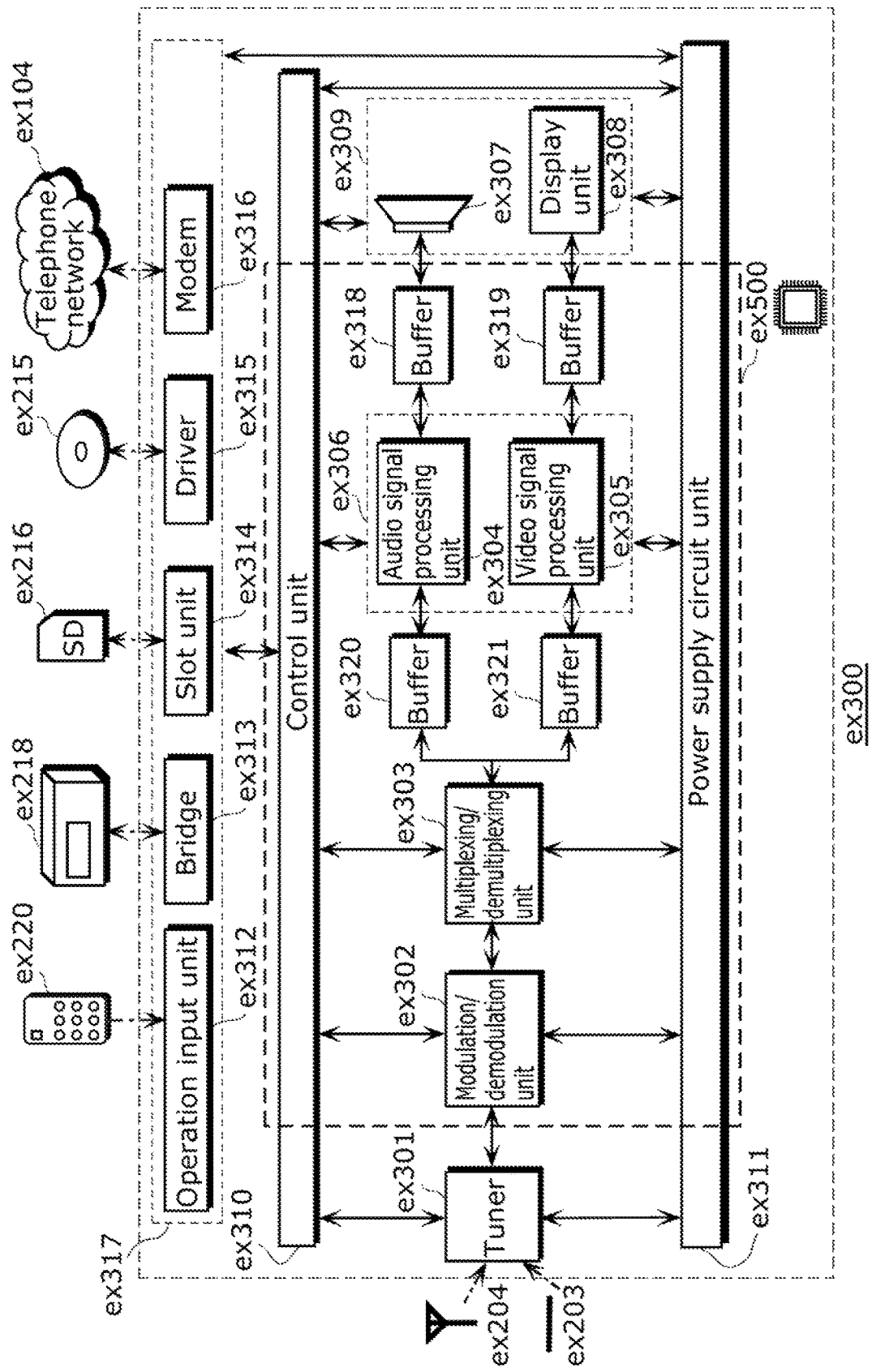
FIG. 20 is a block diagram showing an example of a structure of a television.

FIG. 20 illustrates the television (receiver) ex300 that uses the image coding method and the image decoding method described in Embodiment 1. The television ex300 includes: a tuner ex301 that obtains or provides a bitstream of video information through the antenna ex204 or the cable ex203, etc. that receives a broadcast; a modulation/demodulation unit ex302 that demodulates the received coded data or modulates the received coded data so as to transmit generated coded data outside; and a multiplexing/demultiplexing unit ex303 that demultiplexes video data and audio data resulting from the modulation or multiplexes coded video data and coded audio data. The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes data obtained from outside through the antenna ex204 and others and reproduces the decoded data will be described. In the television ex300, upon a user operation through a remote controller ex220 and others, the multiplexing/demultiplexing unit ex303 demultiplexes video data and audio data demodulated by the modulation/demodulation unit ex302, under control of the control unit ex310 including a CPU and the like. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside, respectively. When the output unit ex309 provides the video signal and the audio signal, the signals may be temporarily stored in, for instance, buffers ex318 and ex319 so that the signals are reproduced in synchronization with each other. Furthermore, the television ex300 may read coded bitstream not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in, for example, the buffers ex320 and ex321 so that the signals are reproduced in synchronization with each other. Here, the buffers ex318, ex319, ex320, and ex321 may be plural as illustrated, or at least one buffer may be shared in the television ex300. Furthermore, although not illustrated, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio data and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes the coded bitstream from or on a recording medium, one of the television ex300 and the reader/recorder ex218 may decode or code the coded bitstream, and the television ex300 and the reader/recorder ex218 may share the decoding or coding.

Figure 21:
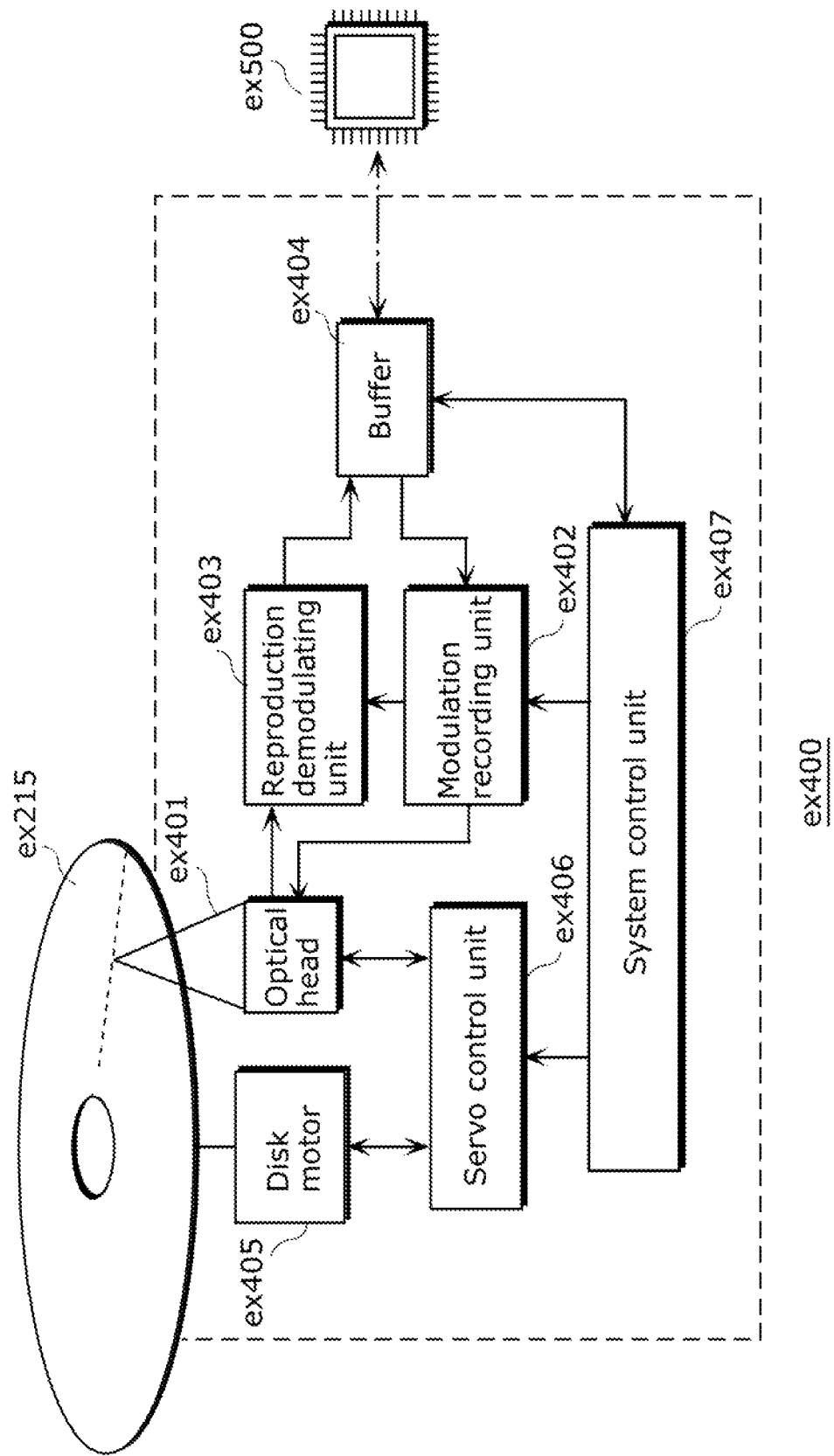
FIG. 21 is a block diagram showing an example of a configuration of an information reproducing/recording unit that reads and writes information from or on a recording medium that is an optical disk.

As an example, FIG. 21 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 22:
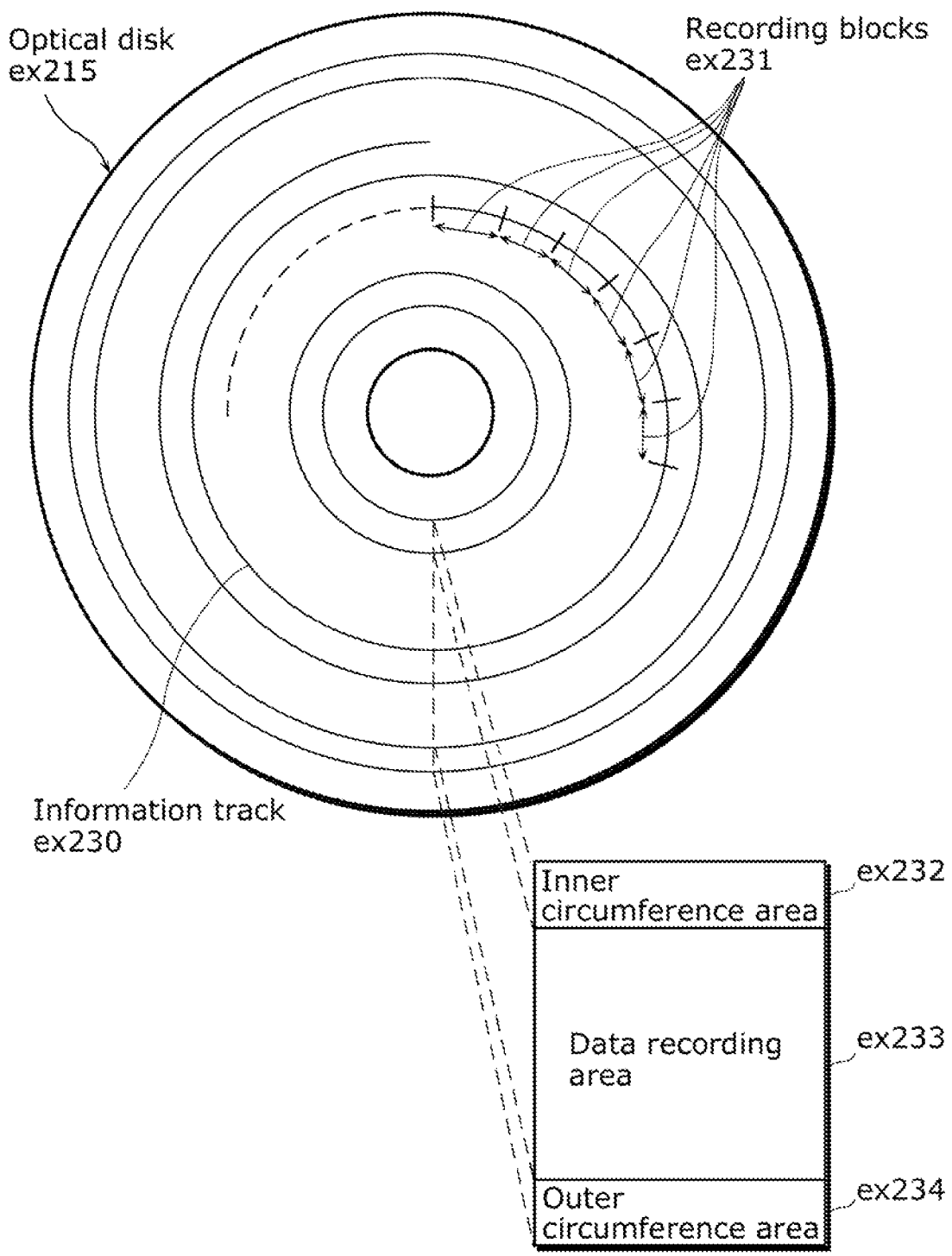
FIG. 22 is a diagram showing an example of a structure of a recording medium that is an optical disk.

FIG. 22 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233 respectively are for specific use except for recording the user data. The information reproducing/recording unit 400 reads and writes coded audio data, coded video data, or multiplexed coded data obtained by multiplexing the coded audio data and the coded video data, from and on the data recording area ex233 of the recording medium ex215.

Although an optical disk having a single layer, such as a DVD and a BD, is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk, and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 20. The same will be true for the configuration of the computer ex111, the cellular phone ex114, and others. Moreover, as with the television ex300, a terminal such as the cellular phone ex114 is conceived to have the following three patterns of implementation: a transmission and receiving terminal including both a coding unit and a decoding unit; a transmission terminal including only the coding unit; and a receiving terminal including only the decoding unit.

As described above, it is possible to apply the image coding method or the image decoding method described in Embodiment 1 to any of the described devices and systems, and such application produces the advantageous effects explained in Embodiment 1.

Furthermore, the present invention is not limited to Embodiment 1, and various modifications and revisions are possible without departing from the scope of the present invention.

Embodiment 3

Figure 23:
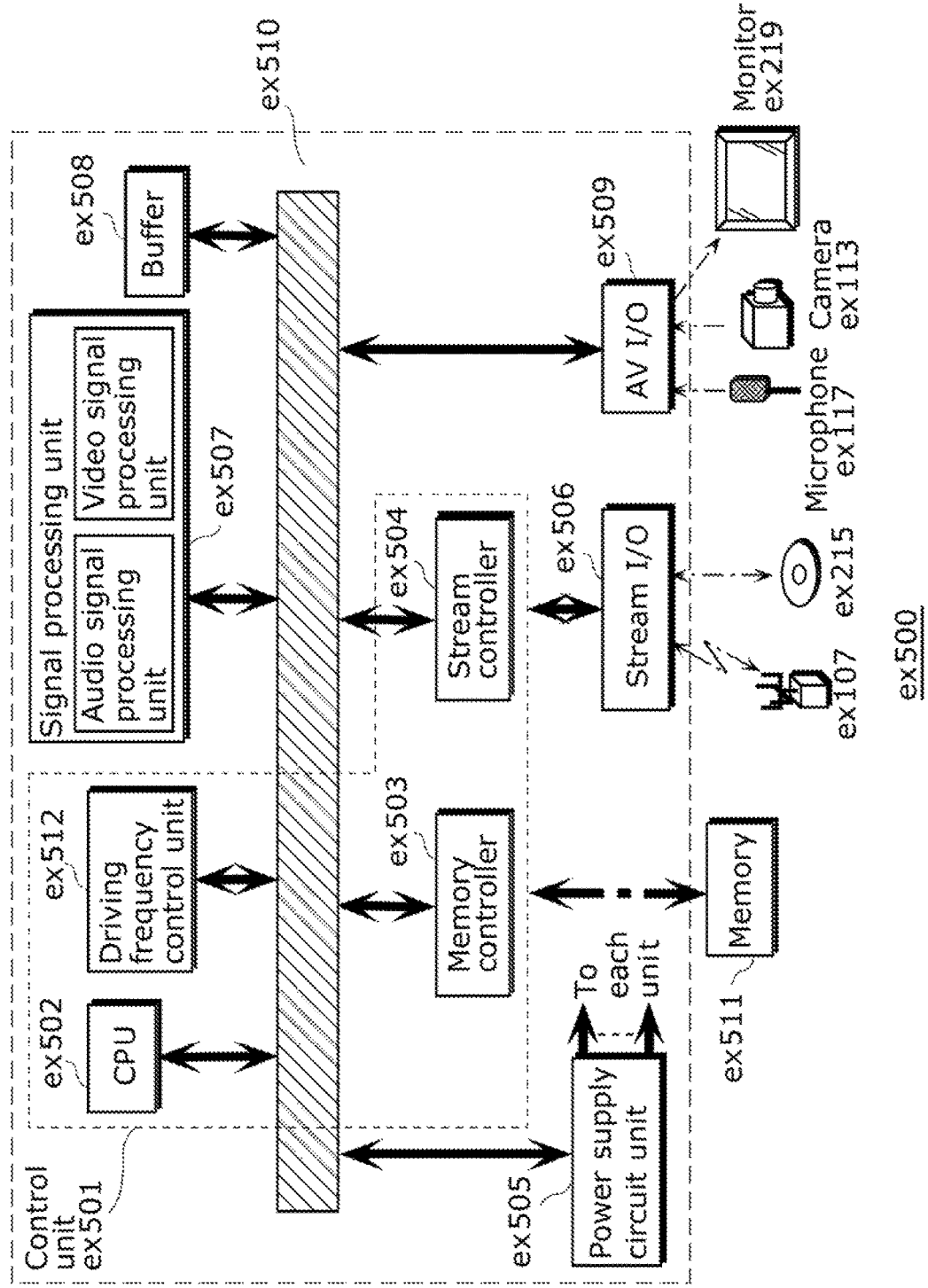
FIG. 23 is a block diagram showing an example of a configuration of an integrated circuit for implementing the image coding method and the image decoding method according to each of embodiments.

Each of the image coding method, the image coding apparatus, the image decoding method, and the image decoding apparatus in each of the embodiments is typically achieved in the form of an integrated circuit or a Large Scale Integrated (LSI) circuit. As an example of the LSI, FIG. 23 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV I/O ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of the embodiments. Furthermore, the signal processing unit ex507 sometimes multiplexes the coded audio data and the coded video data, and a stream I/O ex506 provides the multiplexed data outside. The provided bitstream is transmitted to the base station ex107, or written on the recording media ex215. When data sets are multiplexed, the data should be temporarily stored in the buffer ex508 so that the data sets are synchronized with each other.

Moreover, for instance, when performing the decoding, the LSI ex500 temporarily stores, into the memory ex511 or the like, coded data received by the stream I/O ex506 through the base station ex107 or coded data read from the recording medium ex215, under control of the control unit ex501. Under control of the control unit ex501, the stored data is segmented into data portions according to the processing amount and speed to be transmitted to the signal processing unit ex507. The signal processing unit ex507 decodes audio data and/or video data. Here, the decoding of the video signal is the decoding described in each of the embodiments. Furthermore, the signal processing unit ex507 temporarily stores each of the decoded audio signal and the decoded video signal into the buffer ex508 or the like so that the audio signal and the video signal can be reproduced in synchronization with each other. Each output unit such as the cellular phone ex114, the game machine ex115, and the television ex300 provides a decoded output signal appropriately through the memory ex511 or the like.

Although the memory ex511 is an element outside the LSI ex500 in the above description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of a circuit cell in an LSI can be used for the same purpose.

In the future, with advancement in semiconductor technology, a brand-new technology may replace LSI. The functional blocks can be integrated using such a technology. The possibility is that the present invention is applied to biotechnology.

Although the coding method, the coding apparatus, the decoding method, and the decoding apparatus according to an implementation of the present invention have been described above based on the embodiments, the present invention is not limited to the embodiments. Those skilled in the art will readily appreciate that various modifications in the above embodiments and combination of constituent elements, steps, and the like in different embodiments are possible without materially departing from the novel teachings and advantages of the present invention. Accordingly, all such modifications are intended to be included within the scope of the present invention.

INDUSTRIAL APPLICABILITY

The present invention is effectively applied to an image coding apparatus which codes an image and an image decoding apparatus which decodes a coded image.

REFERENCE SIGNS LIST 10, 10A Image decoding apparatus
11, 21 Matrix obtaining unit
12 Update parameter obtaining unit
13 Matrix decoding unit
14 Image decoding unit
20, 20A Image coding apparatus
22 Update parameter computation unit
23 Coding unit
1200 Quantization scaling matrix parameter parsing unit
1202 Quantization scaling matrix computation unit
1204 Quantization scaling matrix value storing unit
1206, 1216, 1304, 1318 Memory unit
1208, 1312 Inverse quantization unit
1210, 1314 Inverse transform unit
1212 Sample reconstruction unit
1214, 1316 Sample prediction unit
1300 Quantization scaling matrix update parameter computation unit
1302 Quantization scaling matrix parameter writing unit
1306 Subtraction unit
1308 Transform unit
1310 Quantization unit
1320 Addition unit
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113, ex116 Camera
ex114 Digital cellular phone with camera (Cellular phone)
ex115 Game machine
ex117 Microphone
ex200 Digital broadcasting system
ex201 Broadcast station
ex202 Broadcast satellite (Satellite)
ex203 Cable
ex204, ex205, ex601 Antenna
ex210 Car
ex211 Car navigation system (Car navigation)
ex212 Reproduction apparatus
ex213, ex219 Monitor
ex214, ex215, ex216, ex607 Recording medium
ex217 Set top box (STB)
ex218 Reader/recorder
ex220 Remote controller
ex230 Information track
ex231 Recording block
ex232 Inner circumference area
ex233 Data recording area
ex234 Outer circumference area
ex300 Television
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308, ex602 Display unit
ex309 Output unit
ex310, ex501 Control unit
ex311, ex505, ex710 Power supply circuit unit
ex312 Operation input unit
ex313 Bridge
ex314, ex606 Slot unit
ex315 Driver
ex316 Modem
ex317 Interface unit
ex318, ex319, ex320, ex321, ex404, ex508 Buffer
ex400 Information reproducing/recording unit
ex401 Optical head
ex402 Modulation recording unit
ex403 Reproduction demodulating unit
ex405 Disk motor
ex406 Servo control unit
ex407 System control unit
ex500 LSI
ex502 CPU
ex503 Memory controller
ex504 Stream controller
ex506 Stream I/O
ex509 AV I/O
ex510 Bus
ex603 Camera unit
ex604 Operation key
ex605 Audio signal input unit
ex608 Audio signal output unit
ex701 Transmission and receiving circuit unit
ex702 LCD control unit
ex703 Camera interface unit (Camera I/F unit)
ex704 Operation input control unit
ex705 Audio signal processing unit
ex706 Modulation/demodulation circuit unit
ex707 Recording and reproducing unit
ex708 Multiplexing/demultiplexing unit
ex709 Image decoding unit
ex711 Main control unit
ex712 Image coding unit
ex713 Synchronous bus

The invention claimed is:
1. A method for decoding an image or video included in a coded stream when a quantization matrix used to code the image or video is changed from an old quantization matrix to a new quantization matrix, the method comprising the steps of:
obtaining an update parameter from the coded stream;

computing values of a prediction matrix using values of the old quantization matrix and the update parameter;

obtaining values of a delta matrix from the coded stream, the delta matrix representing a difference between the prediction matrix and the new quantization matrix;

computing values of the new quantization matrix by adding the values of the prediction matrix and the values of the delta matrix; and decoding the coded image or video using the new quantization matrix, wherein the update parameter comprises a first update parameter that represents a degree of variation in the values of the new quantization matrix and is multiplied by a difference value between the values of the old quantization matrix and a fixed value.

2. The method of claim 1, wherein the update parameter comprises a second update parameter representing a scale factor between the new quantization matrix and the old quantization matrix.

3. A decoder for decoding an image or video included in a coded stream, when a quantization matrix used to code the image or video is changed from an old quantization matrix to a new quantization matrix, the decoder comprising:

a matrix decoding unit having input thereto from the coded stream an update parameter and a delta matrix representing a difference between a prediction matrix and the new quantization matrix, the matrix decoding unit computing (i) values of the prediction matrix using values of the old quantization matrix and the update parameter and (ii) values of the new quantization matrix by adding the values of the prediction matrix and the values of the delta matrix; and a decoding unit coupled to the matrix decoding unit for decoding the image or video using the new quantization matrix, wherein the update parameter comprises a first update parameter that represents a degree of variation in values of the new quantization matrix and is multiplied by a difference value between the values of the old quantization matrix and a fixed value.

4. The decoder of claim 3, wherein the update parameter comprises a second update parameter representing a scale factor between the new quantization matrix and the old quantization matrix.

5. The decoder of claim 4, wherein the matrix decoding unit computes the prediction matrix based on values of the old quantization matrix, the first update parameter, and the second update parameter.

6. A coder for providing a coded stream comprising an image or video, the coder comprising:

an update parameter computation unit having input thereto an old quantization matrix and a new quantization matrix, the update parameter computation unit computing an update parameter and values of a delta matrix from values of the old quantization matrix and values of the new quantization matrix; and a coding unit coupled to the update parameter computation unit for generating the coded stream comprising the image or video coded using the new quantization matrix, the update parameter and the delta matrix, wherein the values of the new quantization matrix are obtainable by adding (i) values of a prediction matrix obtainable using the values of the old quantization matrix and the update parameter and (ii) the values of the delta matrix, and wherein the update parameter comprises a first update parameter that represents a degree of variation in the values of the new quantization matrix and is multiplied by a difference value between the values of the old quantization matrix and a fixed value.

7. The coder of claim 6, wherein the update parameter comprises a second update parameter representing a scale factor between the new quantization matrix and the old quantization matrix.

8. A decoding apparatus for decoding an image or video obtained from a coded stream, the decoding apparatus comprising:

a processor; and a non-transitory computer-readable recording medium having stored therein executable instructions, which when executed, cause the processor to perform:

obtaining an update parameter from the coded stream;

computing values of a prediction matrix using values of an old quantization matrix and the update parameter;

obtaining values of a delta matrix from the coded stream, the delta matrix representing a difference between the prediction matrix and a new quantization matrix used to code the coded stream;

computing values of the new quantization matrix by adding the values of the prediction matrix and the values of the delta matrix; and decoding the coded image or video using the new quantization matrix, wherein the update parameter comprises a first update parameter that represents a degree of variation in the values of the new quantization matrix and is multiplied by a difference value between the values of the old quantization matrix and a fixed value.

9. The decoding apparatus of claim 8, wherein the update parameter comprises a second update parameter representing a scale factor between the new quantization matrix and the old quantization matrix.

10. The decoding apparatus of claim 8, wherein the coded stream includes an update flag indicating that the image or video has been coded using the new quantization matrix.

11. A coding apparatus for coding an image or video, the coding apparatus comprising:

a processor; and a non-transitory computer-readable recording medium having stored therein executable instructions, which when executed, cause the processor to perform:

computing an update parameter and values of a delta matrix from values of an old quantization matrix and values of a new quantization matrix; and generating a coded stream comprising the image or video, the update parameter, and the delta matrix, wherein the values of the new quantization matrix are obtainable by adding (i) values of a prediction matrix obtainable using the values of the old quantization matrix and the update parameter and (ii) the values of the delta matrix, and wherein the update parameter comprises a first update parameter that represents a degree of variation in the values of the new quantization matrix and is multiplied by a difference value between the values of the old quantization matrix and a fixed value.

12. The coding apparatus of claim 11, wherein the coded stream includes a flag to indicate when the coding apparatus has changed from using the old quantization matrix to using the new quantization matrix to code the image or video.

13. The coding apparatus of claim 11, wherein the update parameter comprises a second update parameter representing a scale factor between the new quantization matrix and the old quantization matrix.

14. The coding apparatus of claim 11, wherein the first update parameter and the second update parameter are computed to minimize the values of the delta matrix.

15. An integrated circuit for decoding a coded image or video included in a coded stream, the integrated circuit comprising:
- a processor; and
- a non-transitory computer-readable recording medium having stored therein executable instructions, which when executed, cause the processor to perform:
   - obtaining an update parameter from the coded stream;
   - computing values of a prediction matrix using values of an old quantization matrix and the update parameter;
   - obtaining a delta matrix from the coded stream, the delta matrix representing a difference between the prediction matrix and a new quantization matrix;
   - computing values of the new quantization matrix by adding the values of the prediction matrix and the values of the delta matrix; and
   - decoding the coded image or video using the new quantization matrix,
- wherein the update parameter comprises a first update parameter that represents a degree of variation in the values of the new quantization matrix and is multiplied by a difference value between the values of the old quantization matrix and a fixed value.

16. The method of claim 1, wherein the old quantization matrix is a quantization matrix having a highest correlation with the new quantization matrix, among quantization matrices decoded.

17. The decoder of claim 3, wherein the old quantization matrix is a quantization matrix having a highest correlation with the new quantization matrix, among quantization matrices decoded.

18. The decoding apparatus of claim 8, wherein the old quantization matrix is a quantization matrix having a highest correlation with the new quantization matrix, among quantization matrices decoded.

19. The integrated circuit of claim 15, wherein the old quantization matrix is a quantization matrix having a highest correlation with the new quantization matrix, among quantization matrices decoded.

20. The coder of claim 6, wherein the old quantization matrix is a quantization matrix having a highest correlation with the new quantization matrix, among quantization matrices coded.

21. The coding apparatus of claim 11, wherein the old quantization matrix is a quantization matrix having a highest correlation with the new quantization matrix, among quantization matrices coded.

22. The method according to claim 2,
wherein in the computing of the values of the prediction matrix, the following equation is used:

Prediction Matrix=(Old Quantization Matrix×Second Coefficient+(Old Quantization Matrix Fixed Value)×First Coefficient)

where First Coefficient=First Update Parameter/Update Denominator, and

Second Coefficient=(Second Update Parameter+Update Denominator)/Update Denominator.

* * * * *